(12) United States Patent
Rudin et al.

(10) Patent No.: US 7,897,303 B2
(45) Date of Patent: Mar. 1, 2011

(54) APPLYING COLOR ELEMENTS AND BUSBARS TO A DISPLAY SUBSTRATE

(75) Inventors: John Christopher Rudin, Bristol (GB); Adrian Derek Geisow, Portishead (GB); Stephen Christopher Kitson, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1080 days.

(21) Appl. No.: 10/587,200

(22) PCT Filed: Mar. 17, 2005

(86) PCT No.: PCT/EP2005/051260
§ 371 (c)(1),
(2), (4) Date: Jan. 16, 2007

(87) PCT Pub. No.: WO2005/091062
PCT Pub. Date: Sep. 29, 2005

(65) Prior Publication Data
US 2007/0099095 A1    May 3, 2007

(30) Foreign Application Priority Data
Mar. 20, 2004  (GB) ................. 0406310.3
Oct. 18, 2004  (GB) ................. 0423134.6

(51) Int. Cl.
*H05B 33/10* (2006.01)
*H01J 9/227* (2006.01)
*G02B 5/20* (2006.01)

(52) U.S. Cl. ........................... 430/7; 430/319; 430/321; 427/68; 427/146; 427/162; 427/164; 427/165; 445/24; 205/78; 205/79

(58) Field of Classification Search ................ None
See application file for complete search history.

(56) References Cited

U.S. PATENT DOCUMENTS

| 3,902,790 | A |   | 9/1975 | Hsieh |   |
|---|---|---|---|---|---|
| 4,830,469 | A |   | 5/1989 | Breddels |   |
| 5,552,192 | A |   | 9/1996 | Kashiwazaki |   |
| 5,576,070 | A |   | 11/1996 | Yaniv |   |
| 5,608,554 | A |   | 3/1997 | Do |   |
| 6,127,199 | A |   | 10/2000 | Inoue et al. |   |
| 6,151,085 | A |   | 11/2000 | Tomono et al. |   |
| 6,162,569 | A | * | 12/2000 | Nakashima et al. | ............ 430/7 |
| 6,304,384 | B1 |   | 10/2001 | Nishikawa |   |
| 6,413,693 | B1 | * | 7/2002 | Bekku et al. | ................. 430/256 |
| 2002/0030767 | A1 | * | 3/2002 | Zavracky et al. | ............... 349/42 |

FOREIGN PATENT DOCUMENTS

| EP | 0 296 429 | 12/1988 |
|---|---|---|
| EP | 1 003 354 | 5/2000 |
| EP | 1 089 113 | 4/2001 |
| JP | 4-165306 | 6/1992 |
| JP | 11142641 | 5/1999 |
| JP | 2003035814 | 2/2003 |
| WO | 96/34971 | 11/1996 |

OTHER PUBLICATIONS

Njo et al. "Light-Efficient Liquid Crystal Displays Using Photoluminescent Color Filters", (2000) pp. 343-345.
Bobrov et al. "Lyotropic Thin Film Polarizers". (2000) pp. 1102-1105.
Crossland et al. "Invited Paper: Photoluminescent LCDs (PL-LCDs) Using Phosphors". (1997) pp. 837-840.

* cited by examiner

*Primary Examiner*—John A. McPherson

(57) ABSTRACT

A method of applying to a display substrate color elements and addressing busbars in a defined alignment relative to each other includes: forming said color elements and said busbars on a surface of a transfer carrier; 10 adhering said color elements and said busbars to said display substrate; and removing said transfer carrier.

31 Claims, 30 Drawing Sheets

APPLYING COLOR ELEMENTS AND BUSBARS TO A DISPLAY SUBSTRATE

RELATED APPLICATIONS

The present application is a National Phase entry of International Application Number PCT/EP2005/051260, filed Mar. 17, 2005, which claims priority from, British Application Numbers 0406310.3, filed Mar. 20, 2004 and 0423134.6, filed Oct. 18, 2004, the disclosures of which are hereby incorporated by reference herein in their entirety.

The present invention relates to a method of applying to a display substrate colour elements and addressing busbars in a defined alignment relative to each other. The colour elements may comprise a colour element matrix of the substrate.

BACKGROUND TO THE INVENTION

The term 'colour element' is used herein to refer to a display component from which coloured light is emitted, transmitted, reflected or scattered when the display is suitably activated. The term includes light filters which absorb certain wavelengths of light, and other components such as wavelength-sensitive reflectors or scatterers, and fluorescent or phosphorescent materials. Commonly, the colour elements are light filters which are part of a colour filter matrix. Displays employing phosphorescent colour elements are described in U.S. Pat. No. 4,830,469 and U.S. Pat. No. 5,608,554.

The colour element matrix is one of the most expensive components in a lightvalve-type backlit display, for example a liquid crystal polarisation switch mode display. The colour element must be physically close to the electro-optic switching layer to avoid colour parallax, and must be aligned with at least the 'column' electrode patterning in the case of RGB colour stripes. Difficulties in achieving this alignment add to manufacturing costs.

A known production process involves patterning the colour matrix onto the final display substrate, planarising the matrix, and then forming the display cell. While this minimises the distance between the electro-optic switch and the colour filter element, it is very expensive and requires multiple lithographic steps.

A method of forming electrode patterns for a passively-addressed alphanumeric liquid crystal display (LCD) is described in U.S. Pat. No. 3,902,790. The method involves providing gold-plated stripes for busbars and other conductive elements which are in areas where characters are not displayed, to provide highly conductive paths between display characters. Methods of forming colour filters for LCDs by ink jet printing in pre-defined channels are described in JP 2003035814, JP 11142641, U.S. Pat. No. 5,552,192 and U.S. Pat. No. 5,576,070. Busbars are also used to address other types of displays, for example active matrix LCDs, in which operation of each pixel is controlled by a corresponding thin film transistor (TFT).

SUMMARY OF THE INVENTION

According to an aspect of the present invention there is provided a method of applying to a display substrate colour elements and addressing busbars in a defined alignment relative to each other, the method comprising:
 forming said colour elements and said busbars on a surface of a transfer carrier;
 adhering said colour elements and said busbars to said display substrate; and
 removing said transfer carrier.

In a preferred embodiment, the colour elements are light filters. The invention will for convenience be described with reference to light filters unless the context requires otherwise, but it is to be understood that the invention is not limited to this embodiment.

By forming light filters that absorb visible light to produce colour, the method may provide a colour filter matrix which is aligned with the addressing busbars. The method is suitable for accurately aligning the colour filter matrix to the pixel matrix on a large area display. The display substrate may be glass or a plastics material. Additionally, or alternatively, the light filters may absorb UV light, which will enable them to be used in the formation of transparent electrode tracks in self-alignment with the busbars, as will be described in more detail later.

In another embodiment of the invention, photoluminescent or other optically modifying materials can be used in place of materials which only filter the incident illumination. Displays of this type are described in "Photoluminescent LCDs (PL-LCDs) Using Phosphors", W. A. Crossland, I. D. Springle and A. B. Davey, Society Information Display Proceedings 1997, p837 and "Light-Efficient Liquid Crystal Displays Using Photoluminescent Color Filters", S. W. Njo et al, Society Information Display Processings 2000, p343. It is noted in U.S. Pat. No. 4,830,469 (Breddels et al.), that there is significant advantage in placing the patterned photoluminescent material in close proximity to the light valve to avoid the requirement for a collimated backlight. In this invention a practical means of constructing such a display is presented.

The method is of particular application to the manufacture of substrates for passive-addressed x/y matrix structures which are elongate parallel lines or strips, and the invention will be illustrated with reference to this application. However the busbars could also take other shapes and forms of addressing metal structures. For example, the busbars may be used as addressing structures for active matrix LCDs and may form the TFT devices and crossovers for the addressing matrix.

The surface of the transfer carrier is preferably planar, and this planarity defines the final surface quality of the colour element matrix/busbar combination. By using a carrier with a highly planar surface, the invention may provide a final, highly planar surface to the colour element matrix or matrix/busbar combination without the need for a separate planarising operation. An advantage of using a carrier with a planar surface is that the surface quality of the display substrate onto which this is transferred does not have to be very good. If a polariser is laminated on the inner surface of the substrate then birefringence of the substrate becomes unimportant and a substrate with uncontrolled birefringence can be used.

The busbars and colour filters are transferred by adhesive onto the final display substrate. The alignment of the busbars and colour filters relative to each other on the transfer carrier is preserved on the display substrate. Before the transfer step there is the opportunity to deposit one or more optical films, for example polarisers or compensation retarders, which are also transferred and end up on the inside of the display. A polariser may be of conventional construction, adhered between the substrate surface and the colour filter matrix, or it may be a coatable polariser which may be coated on the colour filter matrix or the substrate surface. The term "optical film" is used herein to denote a film which modifies at least one property of light incident thereon.

According to another aspect of the invention there is provided a method of applying to a display substrate light-filters and addressing busbars in a defined alignment relative to each other, the method comprising the steps of:

(a) forming a series of translucent dielectric structures on a planar surface of a carrier, each structure comprising a colour element-receiving surface region and a raised levee, adjacent dielectric structures being spaced apart to define a trench therebetween;

(b) forming said busbars by at least partially filling each of said trenches with an electrically conductive material;

(c) depositing a colour-element material on each of said colour element-receiving surface regions to form a series of colour elements;

(d) affixing said colour elements and levees to a translucent display substrate by means of a translucent adhesive material; and (e) removing said carrier.

The dielectric structures may be formed on the carrier by any suitable means, for example embossing, micromoulding, laser ablation or photolithography. In a preferred embodiment the dielectric material is optically transparent and is formed by UV micromoulding, as taught in WO 96/34971, the content of which is incorporated herein by reference.

The colour element material may be a colour filter material, and the colour element may be a colour filter.

An embodiment of the invention uses the same dielectric structures to define both the position of the busbars and the formation of defined channels into which the colour element material can be deposited. It is preferred that the element-receiving surface is generally flat but suitably roughened to help the applied colour element material wet out and key in. A preferred method of depositing the colour element material is by inkjet deposition, for example drop-on-demand inkjet printing.

Once the busbars and colour elements are transferred to the final substrate a transparent conducting material (eg, PEDOT or ITO) is applied and, if required, patterned, using a serial (eg, laser ablation) aligned technique, or by using the colour filter/busbar construction as a shadowing/alignment system.

A further embodiment of the invention relates to the deposition of transparent conducting material into the defined channels prior to the deposition of the colour filter material using a technique described in GB 0423134.6. In this embodiment there is a further advantage in using the same raised structures to define the electrode patterning directly by using a simple uniform coating technique such as gravure or slot coating for the transparent conductor.

A combination of elements and busbars may also be used to provide transparent electrode structures in alignment with the busbars even where there is no colour element matrix. By using other element materials instead of colour elements, for example UV-absorbing filters, with UV-transmitting dielectric structures, the electrode structures may be patterned in the same manner as when colour elements are present.

The trenches and levees will typically be linear structures that will extend across the length of the substrate. Any desired spacing may be used, for example they may be 50 to 200 µm apart, notably about 100 µm apart, and they may be many metres in length. Although the colour element-receiving regions are preferably roughened to promote wetting of the surface by the colour element material, the tops of the levees are preferably smooth or otherwise surface-treated to discourage wetting and flow of one colour material into an adjacent channel.

Other aspects and benefits of the invention will appear in the following specification, drawings and claims.

The invention will now be further described, by way of example only, with reference to the following drawings.

DETAILED DESCRIPTION

Figure 1:
FIGS. 1 to 9 illustrate stages in the manufacture of a display substrate having colour filters, busbars and electrode tracks in a predetermined alignment, in accordance with an embodiment of the present invention.

In the drawings, different parts have been enlarged or reduced to aid illustration of the invention. The drawings are therefore not to scale.

A transfer carrier 1 for use in the invention is shown in FIG. 1. The carrier 1 comprises a base film 2 on which is coated a planar, conductive layer 3. The carrier 1 may be rigid or flexible. In this example, the base film 2 comprises 150 µm thick PET and the conductive layer 3 is copper metal of about 1 µm thickness. In this example, the conductive copper layer 3 has an exposed surface that is optically flat and which has been passivated by immersion in 0.1 N potassium dichromate solution for 5 minutes, rinsed with deionised water and air dried.

Figure 2:
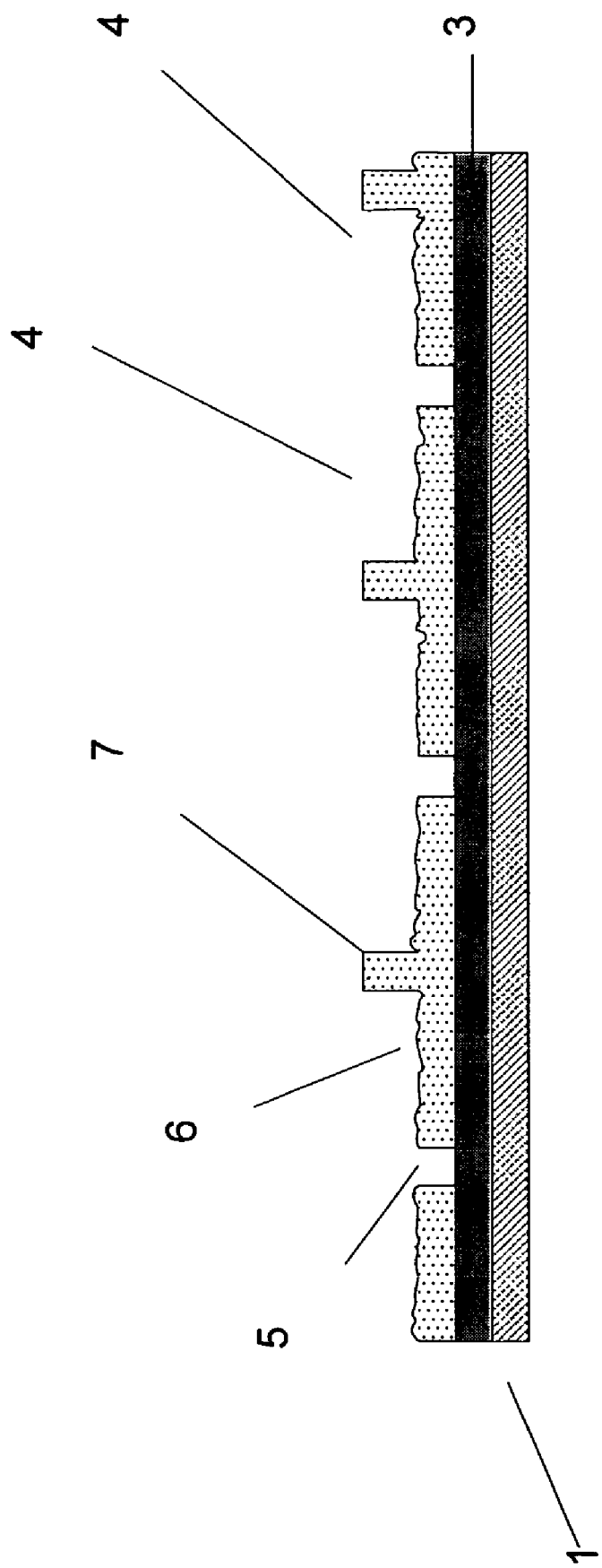

Referring now to FIGS. 2-5 and 29, according to an embodiment of the present invention, the first general step, designated as block 33, is to form colour elements (in this embodiment, light filters) and busbars on the transfer carrier substrate. A multiple-level, controlled-roughness pattern of dielectric structures 4 is formed on the exposed surface of the conductive layer 3 of the carrier 1 (FIG. 2). The dielectric material is optically transparent and in this example is formed by micromoulding as taught in WO 96/35971. The dielectric structures 4 are separated from each other by a series of parallel trenches 5, in which the busbars will be formed. Each structure 4 comprises a rough, planar area 6 and a raised levee 7. The planar areas (filter-receiving surfaces) 6 will accept the colour filter layers and the levees 7 will separate the colour filters. The trenches and levees are substantially linear structures which will run across the length or width of the substrate to which they are transferred. They are typically about 100 µm apart and up to many metres in length. The rough planar surfaces 6 will permit spreading of an applied ink jet coating and may optionally be treated to promote wetting. The levees 7 are smooth and may optionally be treated to further discourage wetting and flow of one colour material into an adjacent planar area.

Figure 3:
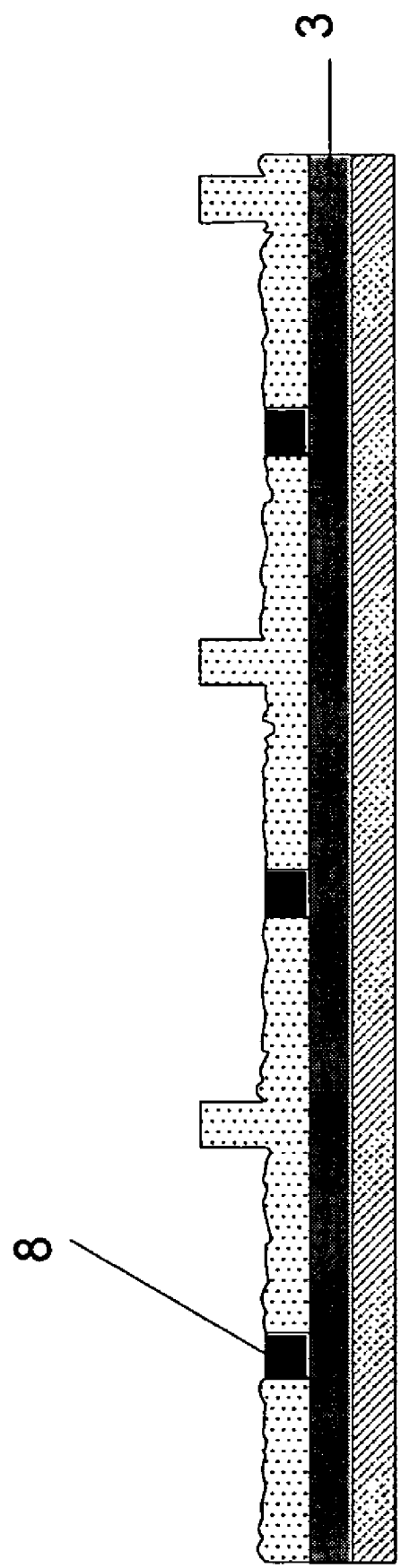

Referring now to FIG. 3, conductive material 8 is formed in the trenches 5. The conductive material is preferably a metal and, in this example, is formed by additive electroforming. It is preferred that the conductor 3 forms the cathode of an electrolytic cell with a nickel anode and standard nickel sulphamate-based electrolyte. Plating may be carried out by DC, with pulsed or biased AC current being used to fill in the trenches completely. Other known electroplating or electroless plating techniques may be employed. Suitable metals include nickel, copper and gold.

Figure 4:
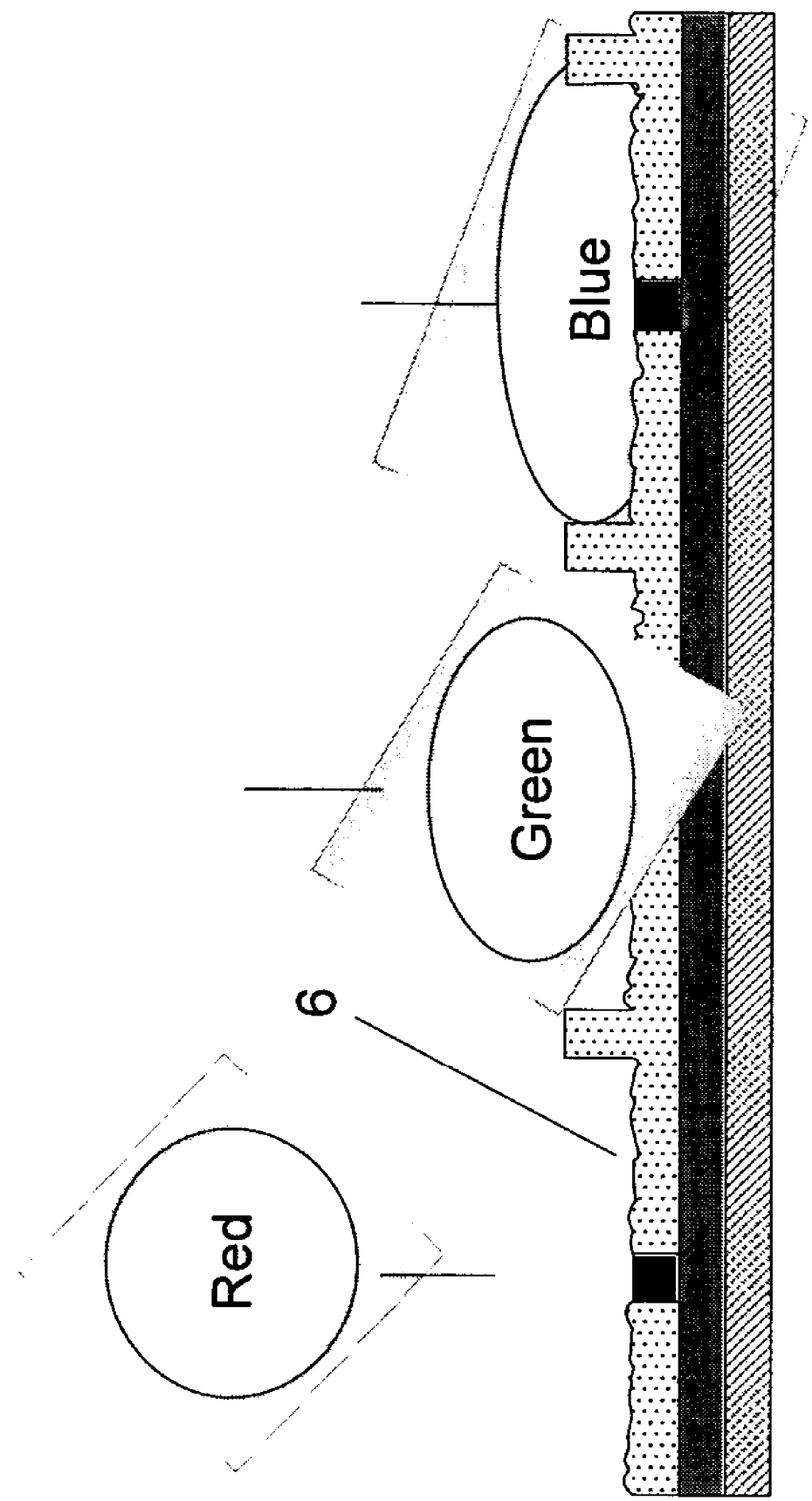
Figure 5:
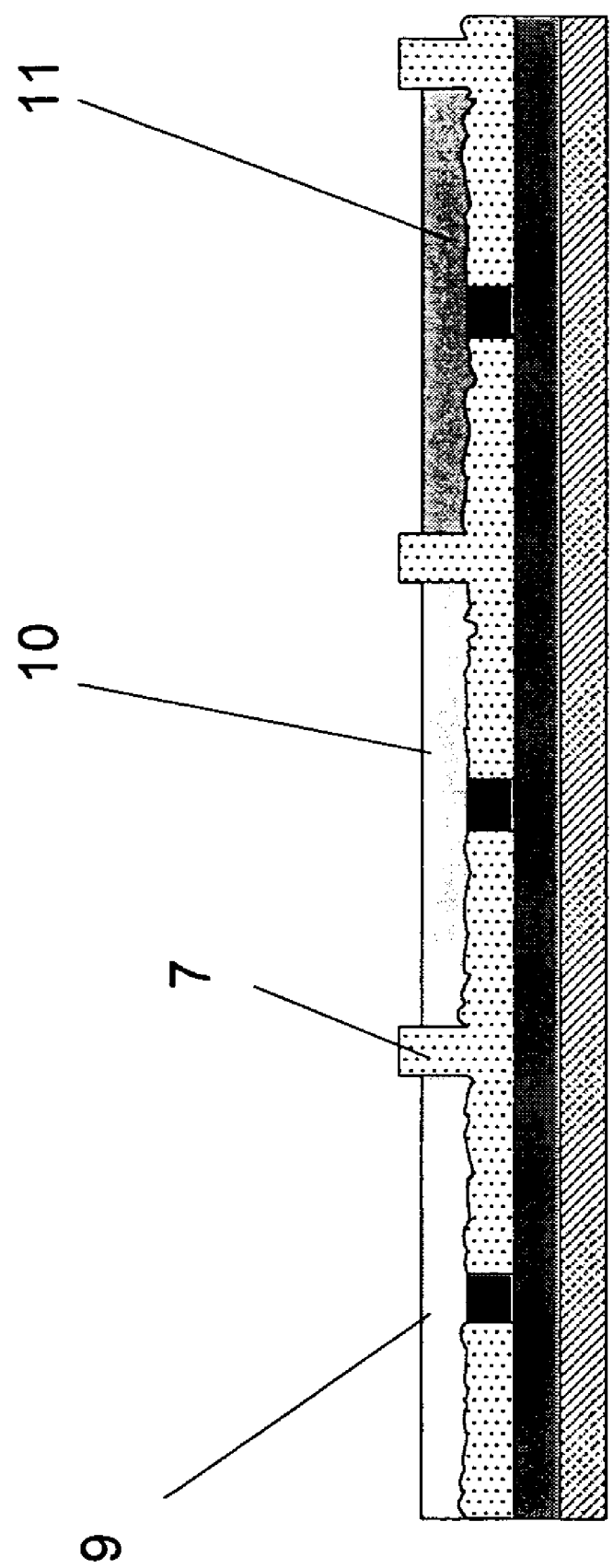

The resulting metallised structure is coated with colour filter material (FIGS. 4 and 5). In this example the material is deposited by ink jet printing in the colour-receiving planar areas 6 to produce red 9, green 10, and blue 11 colour filter triads. Other colour combinations may optionally be used. Alternatively, for an embodiment which will be described later, the filters 9, 10, 11 may be UV absorbing but substantially transmit all wavelengths of visible light. In a preferred embodiment, the colour filter material is a dyed UV-curable resin (Brewer Science, Inc PDC). Examples of suitable inkjet nozzles include thermal and piezo nozzles, although other depositing means and techniques may be used. The alignment of droplets is not critical because the filter material is allowed to spread out across the planar regions 6 and is constrained by the levees 7 from flowing into the adjacent channels. The filter material 9, 10, 11 may be cured after coating, for example by UV exposure and/or thermal treatment.

Figure 6:
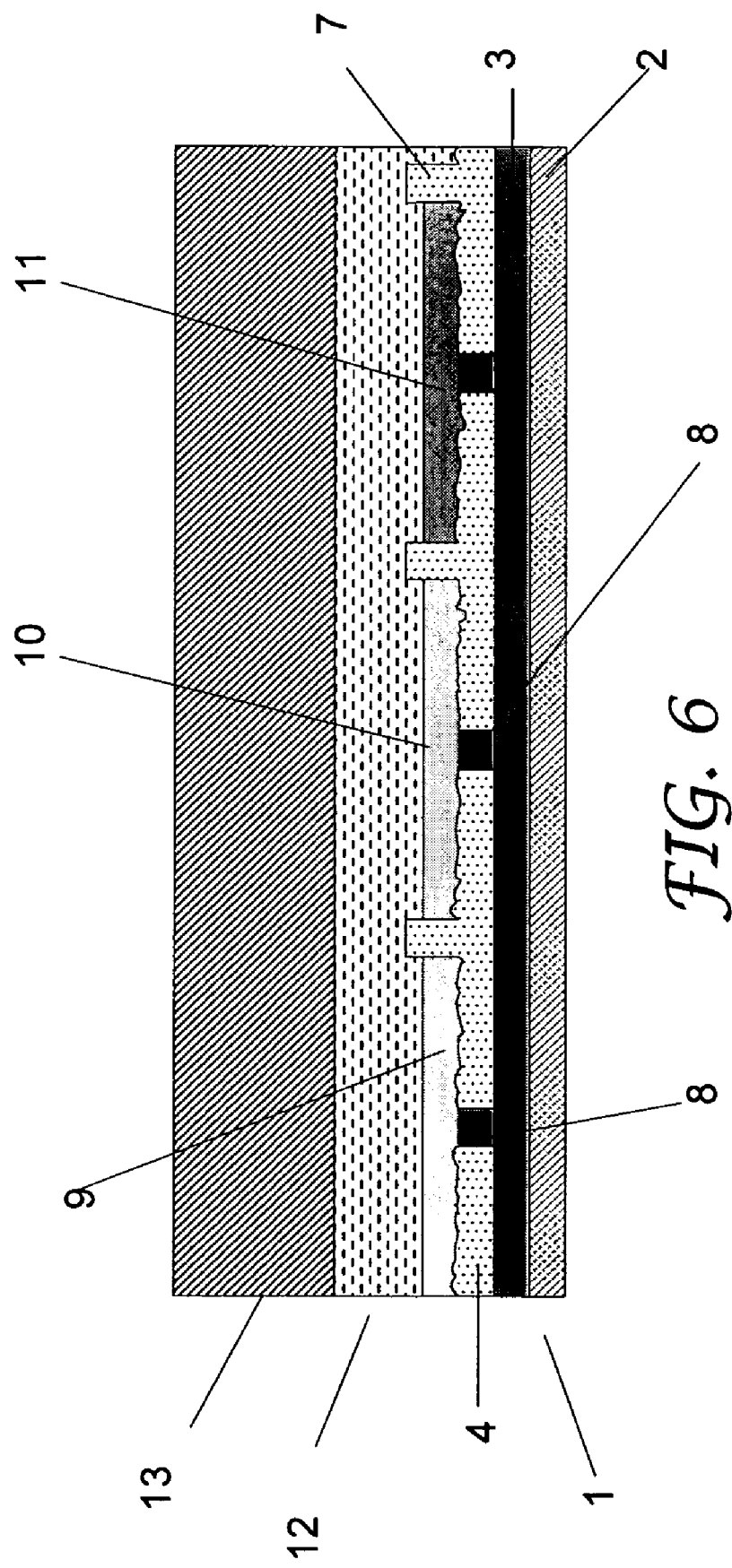
Figure 29:
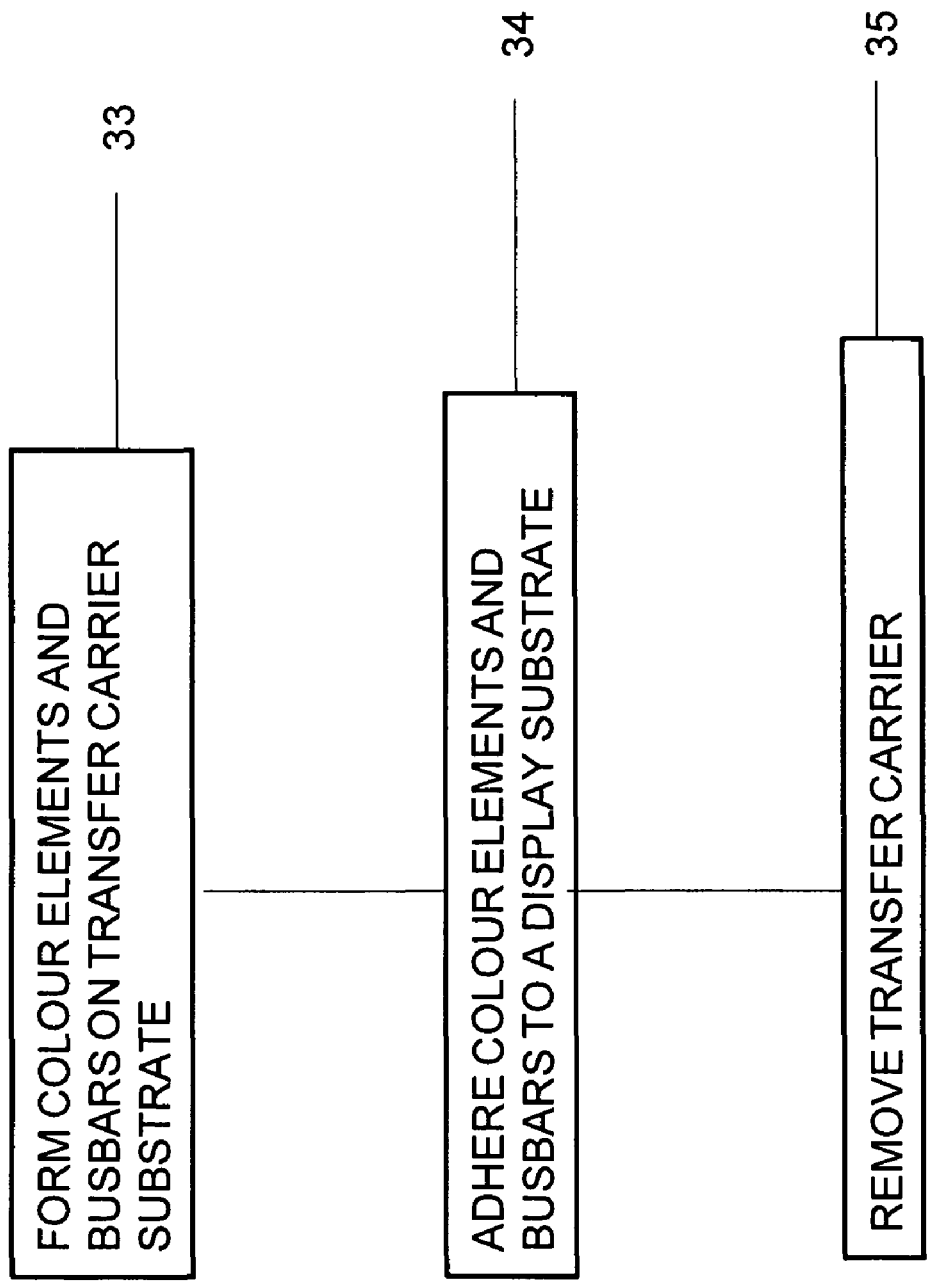
FIGS. 29 and 30 are flow charts illustrating steps in carrying out methods according to embodiments of the present invention.
Figure 30:
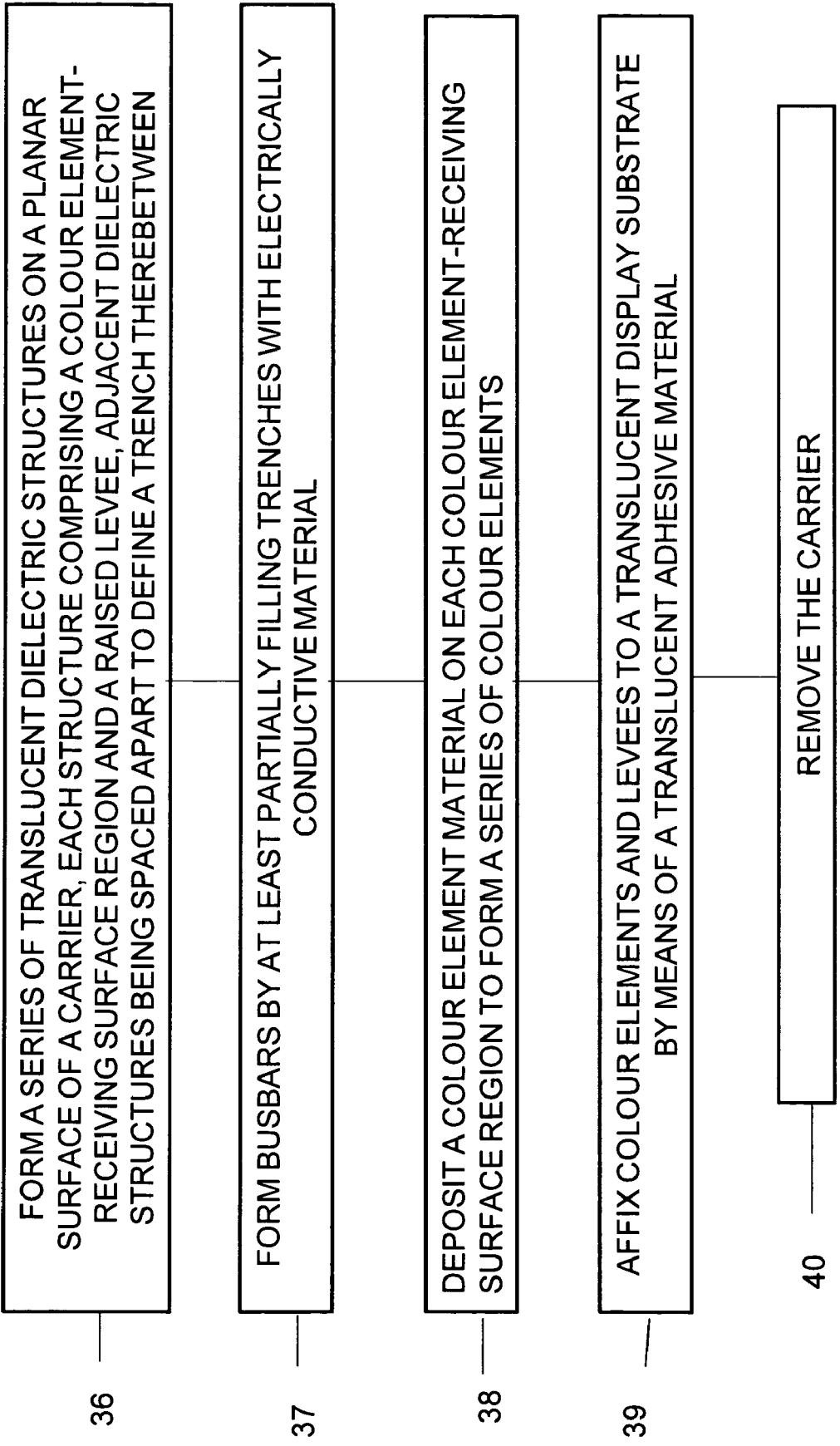

Referring now to FIGS. 6 and 29, the next general step, designated as block 34, is to adhere the light filters (colour elements) and busbars to a display substrate. After curing of the colour elements 9, 10, 11, the resulting structure is then treated with a transfer adhesive 12, and the final display substrate 13 is laminated and the adhesive 12 is cured (FIG. 6). In a preferred embodiment the transfer adhesive 12 is a UV-curable material such as NOA81 (Norland Optical Products) but may be thermal- or moisture-cured. The display substrate 13 is preferably a plastics material, for example PEN (DuPont Teijin Teonex Q65), PES (Sumitomo Bakelite) or polyArylate (Ferrania SpA-Arylite), but could comprise glass, preferably a UV-translucent glass.

Figure 7:
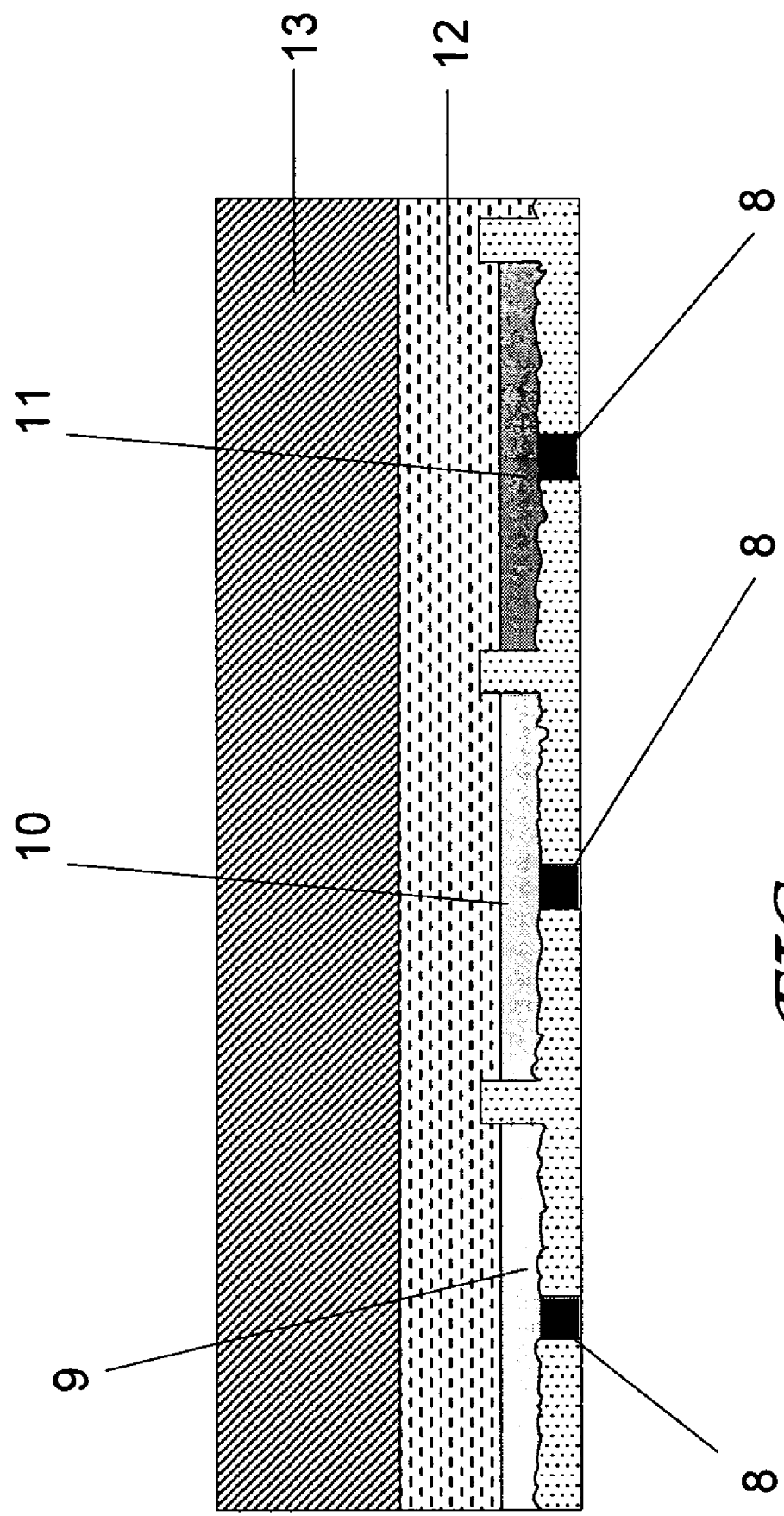

The carrier 1 is then removed (FIG. 29, block 35), in this example by peeling away of the transfer carrier, leaving the colour element/busbar laminate shown in FIG. 7.

Another embodiment of the invention is illustrated with reference to FIGS. 1-7 and FIG. 30. In a first general step, designated as block 36, a series of translucent dielectric structures 4 are formed on a planar surface of a carrier 1, each dielectric structure 4 comprising a colour element-receiving surface region 6 (in this example, a filter-receiving surface region 6) and a raised levee 7, adjacent dielectric structures 4 being spaced apart to define a trench 5 therebetween (FIG. 2). In the next general step, designated as block 37, busbars 8 are formed by at least partially filling the trenches 5 with electrically conductive material (FIG. 3). In the next general step, designated as block 38, a light-filter (colour element) material is deposited on each colour element-receiving surface region 6 to form a series of light filters 9, 10, 11 (FIGS. 4 and 5). In the next general step, designated as block 39, the light filters 9, 10, 11 and levees 7 are affixed to a translucent display substrate 13 by means of a translucent adhesive material 12 (FIG. 6). In the next step, designated as block 40, the carrier 1 is removed (FIG. 7). In the illustrated embodiments, further optional process steps are carried out as described below.

Figure 8:
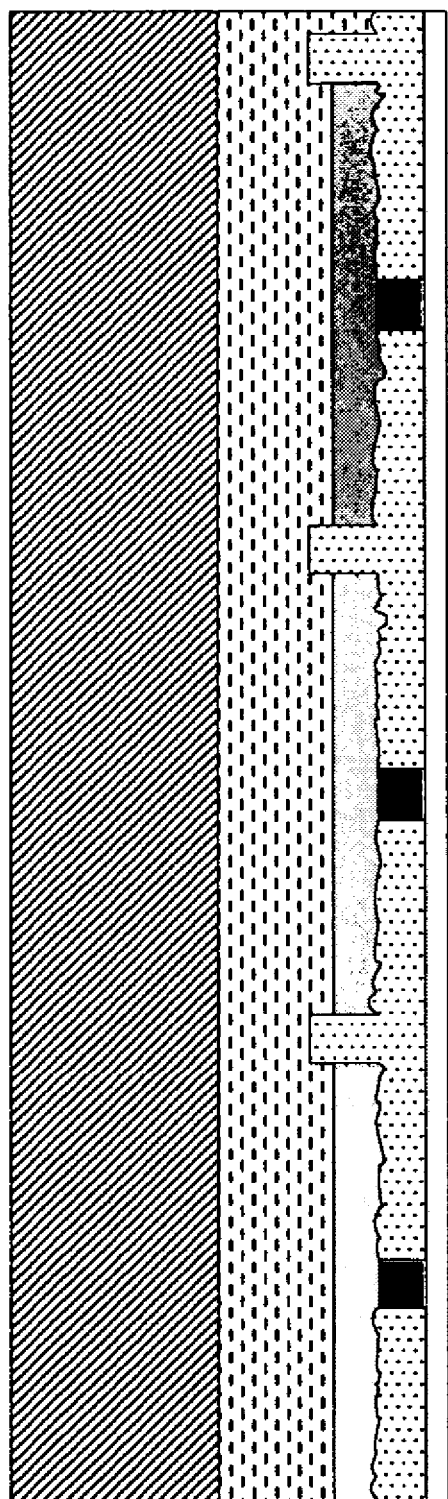

To form electrodes, a transparent conductor 14 is deposited onto the released surface of the laminate structure, as illustrated in FIG. 8. The conductor 14 may comprise indium oxide, tin oxide, indium tin oxide (ITO) or the like, but is preferably an organic conductor such as PEDOT:PSS (Bayer Baytron P).

Figure 9:
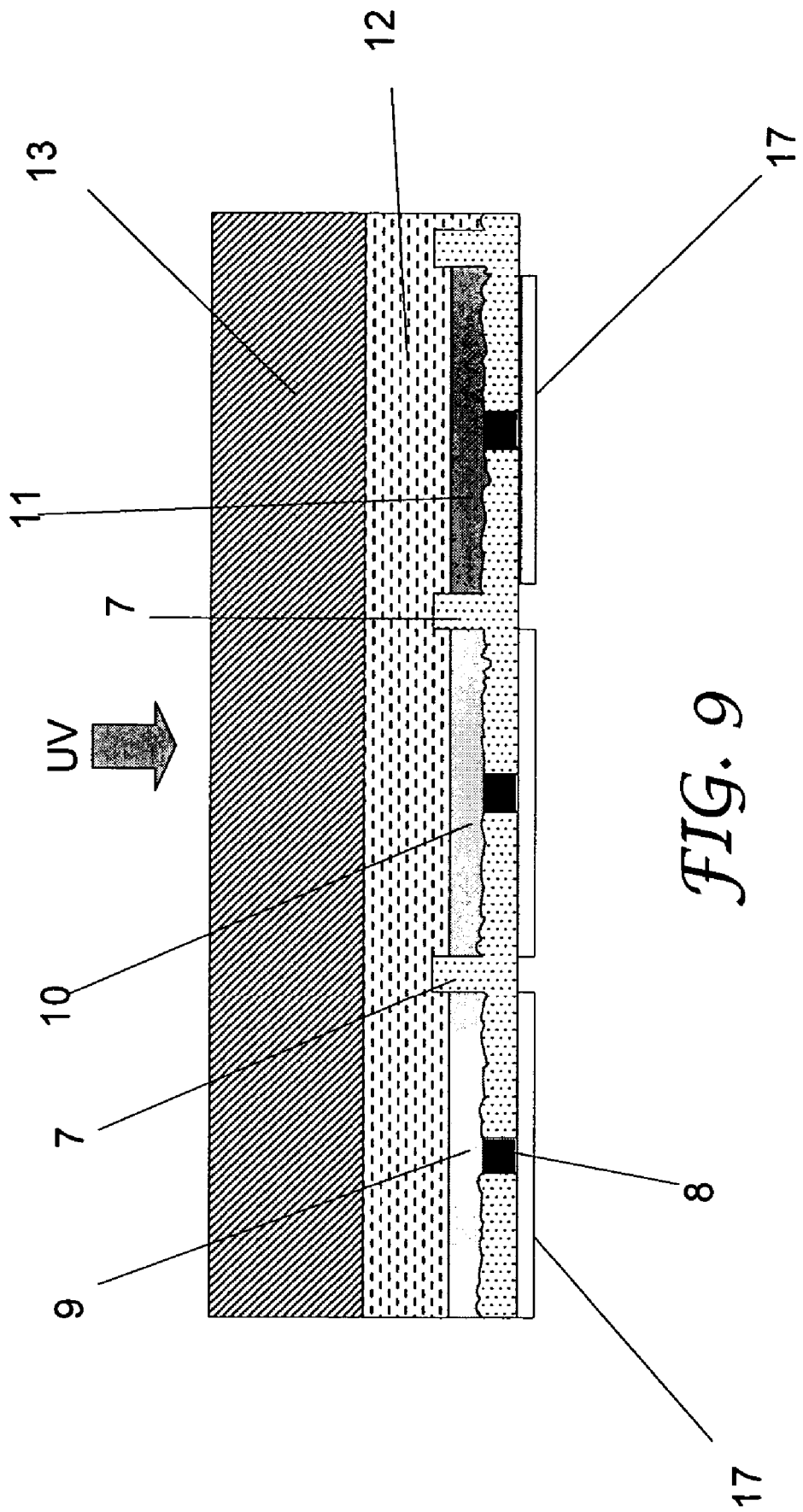
Figure 10:
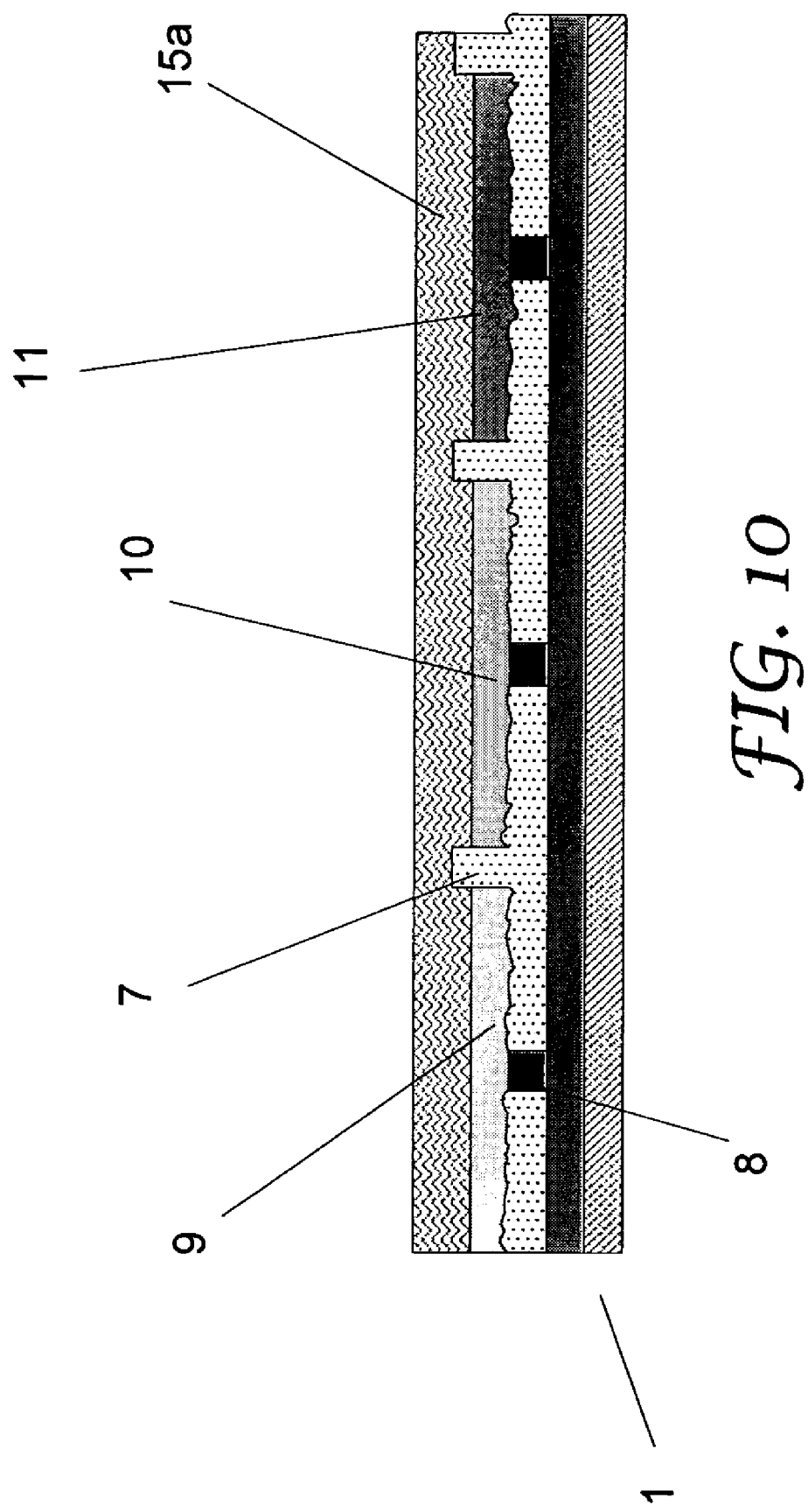
FIGS. 10 to 13 illustrate stages in a method of manufacture in accordance with an alternative embodiment of the present invention.
Figure 11:
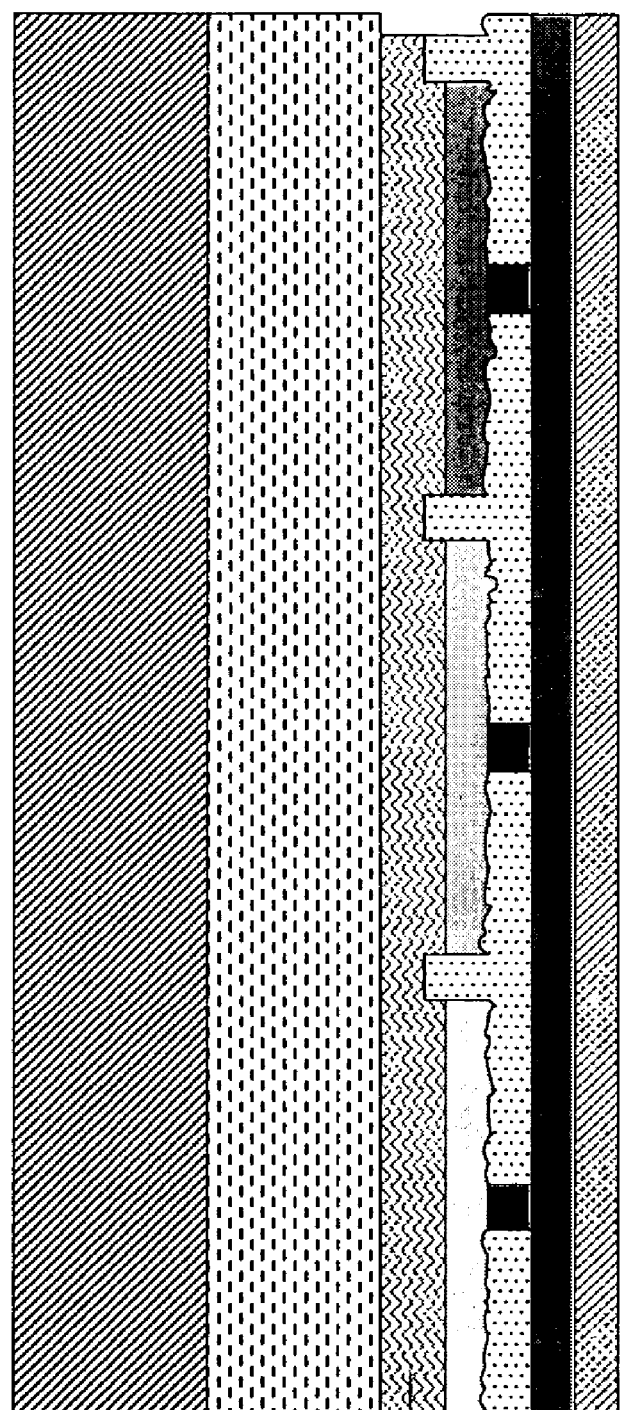
Figure 12:
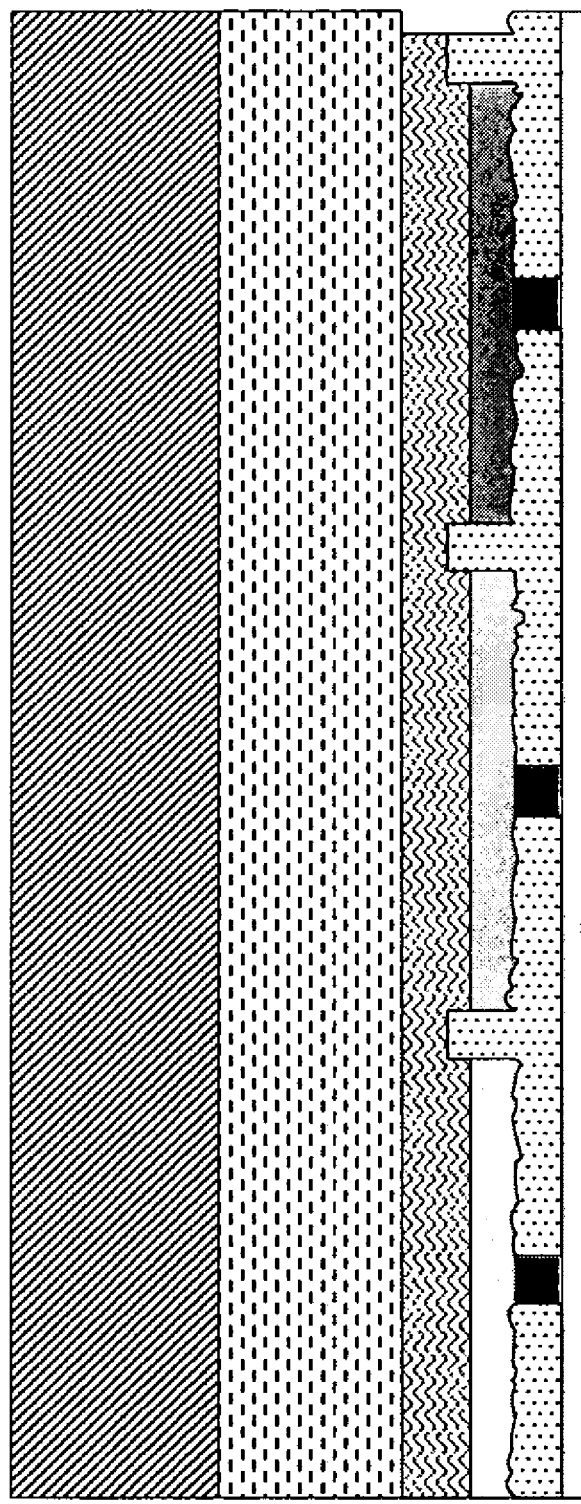
Figure 13:
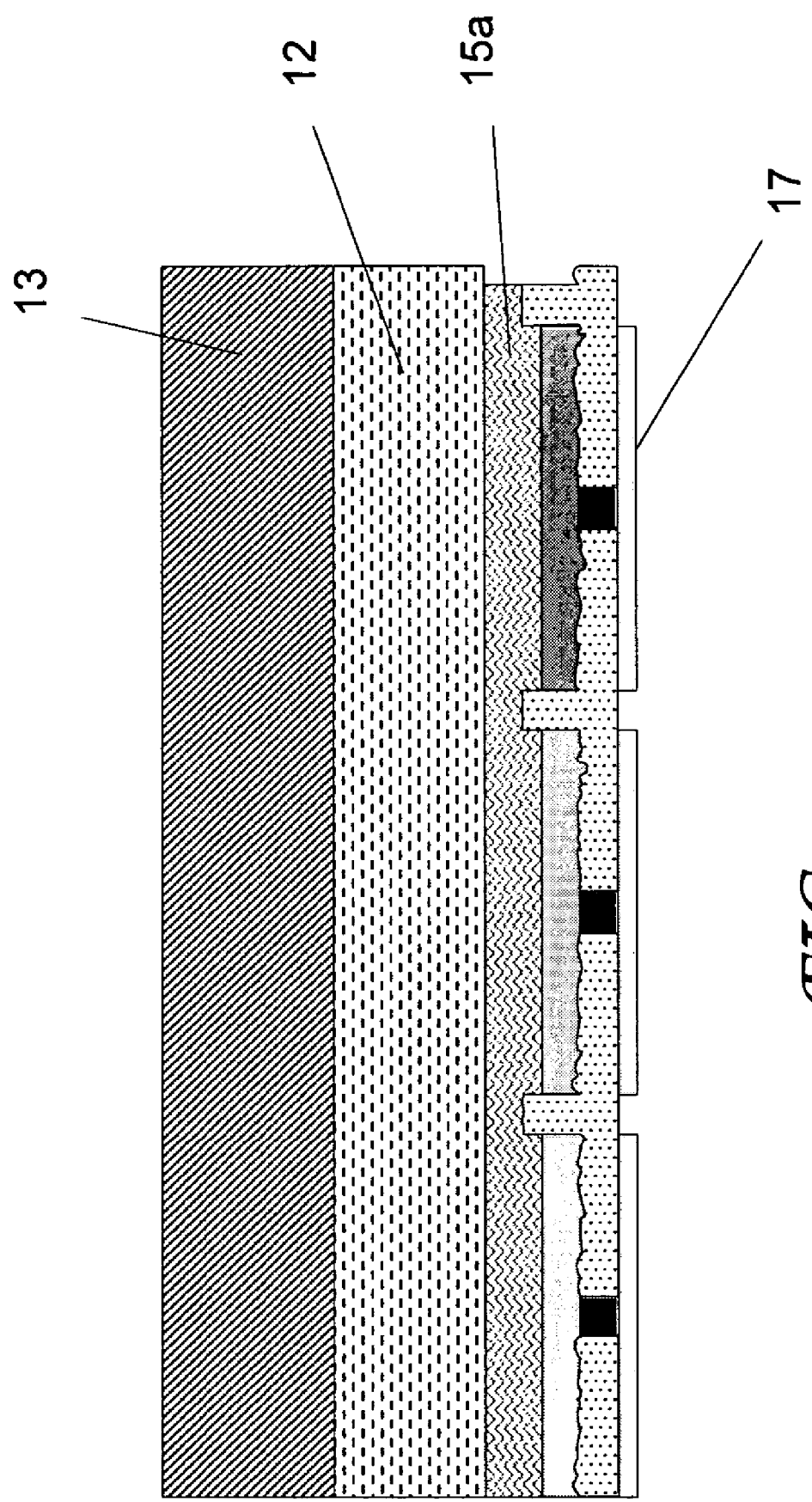
Figure 14:
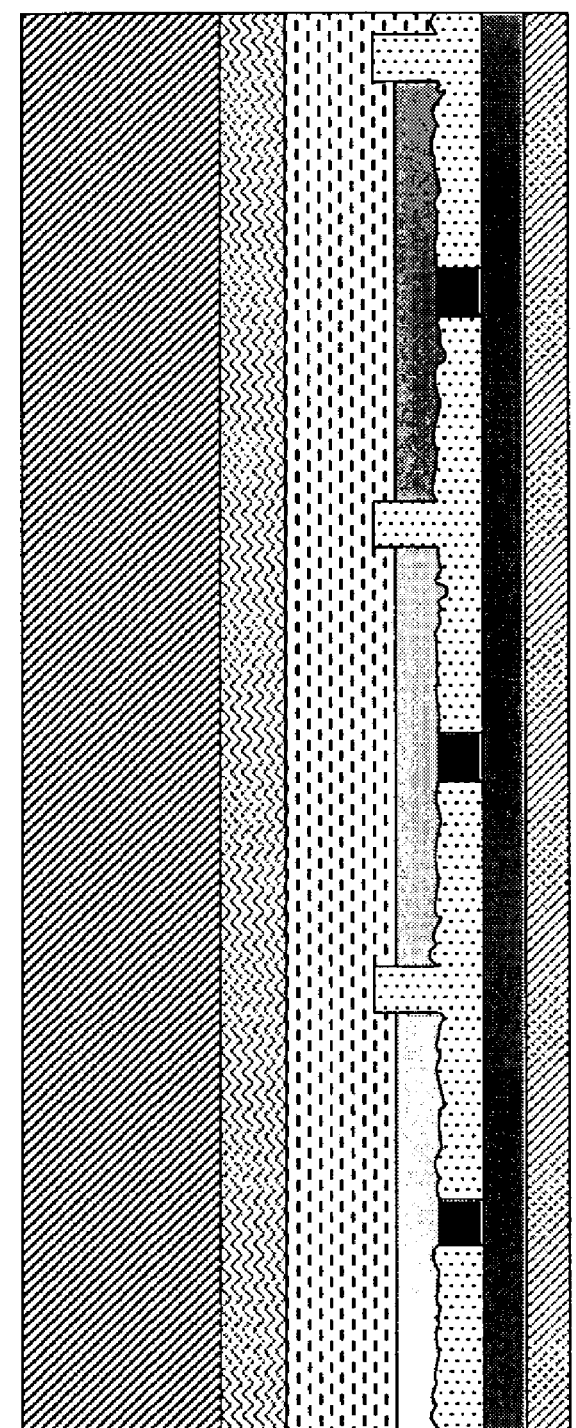
FIGS. 14 to 17 illustrate stages in a method of manufacturing a device substrate in accordance with a further alternative embodiment of the present invention.
Figure 15:
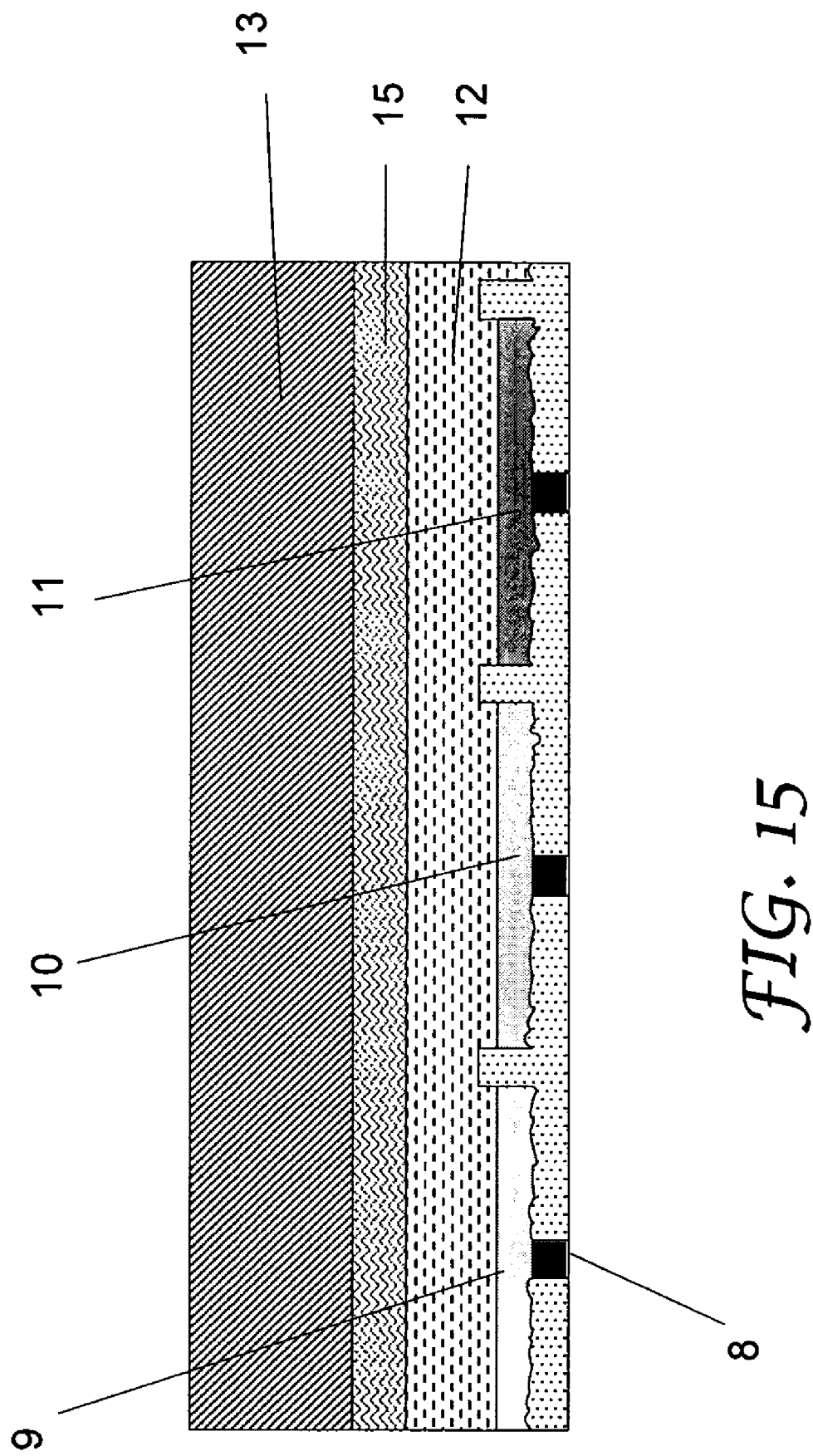

The transparent conductor 14 is then selectively etched or patterned to provide transparent electrodes 17. In the present embodiment, illustrated in FIG. 9, the conductor 14 is photopatterned by illuminating the laminate from the reverse (substrate 13) side. The colour filters 8, 10, 11 are at least partially opaque to UV, whilst the substrate 13, transfer adhesive 12 and dielectric 4 are not. Consequently, substantially the only UV transparent areas are the raised levees 7. This method has the additional advantage in that any faults in the deposition of the filter material resulting in a hole in that layer will result in the transparent electrode at that location being removed and consequently no electro-optical switch in that area. In the preferred embodiment, PEDOT:PSS is bleached directly by the incident UV light to form the electrode structures 17. Alternatively, standard photoresists and etching may be employed, as will be described later.

The resulting display substrate has colour filters, busbars and transparent electrodes in a predetermined alignment. It may be incorporated in a display, for example a liquid crystal display, using fabrication techniques well known per se to those skilled in the art of display manufacture.

Referring now to FIGS. 10 to 13, a modification of the process in illustrated in which a coatable polariser layer 15*a* is applied on top of the colour filter laminate structure shown in FIG. 5. After curing of the coatable polariser layer 15*a*, the resulting structure is adhered to a display substrate 13 using a transfer adhesive 12, followed by removal of the carrier 1, application of a transparent conductor 14, and formation of transparent electrodes 17 in a manner as previously described. A suitable coatable polariser material is sold by Optiva, Inc. Coatable polarisers are described in Bobrov, Y., Cobb, C., Lazarev, P., Bos, P., Bryand, D., Wonderly, H. "Lyotropic Thin Film Polarisers", *Society for Information Display, Int. Symp. Digest of Technical Papers*, Long Beach, Calif. May 16-18, 2000, Vol. XXXI, 1102-1107.

The process illustrated with respect to FIGS. 14 to 17 is similar to that illustrated with respect to FIGS. 6 to 9, with the difference that the colour filter/busbar structure shown in FIG. 5 is adhered to an optical film 15, in this example a polariser, which is in turn adhered to the display substrate 13. Methods for adhering conventional polarisers to display substrates will be well known to those skilled in the art of LCD manufacture. Other optical films 15, such as a compensation retarder, may also optionally be laminated inside the display without affecting the planarity and performance of the electro-optic layer interface.

Figure 16:
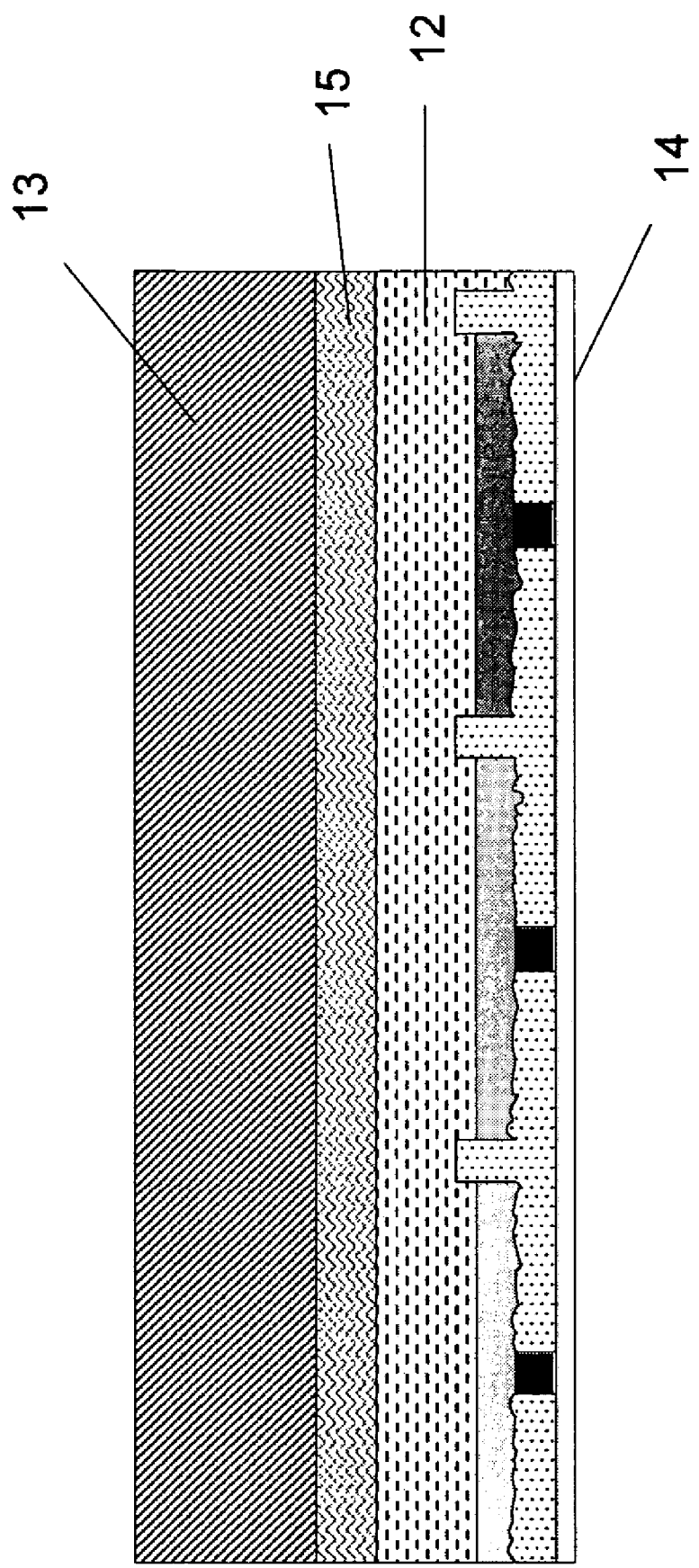
Figure 17:
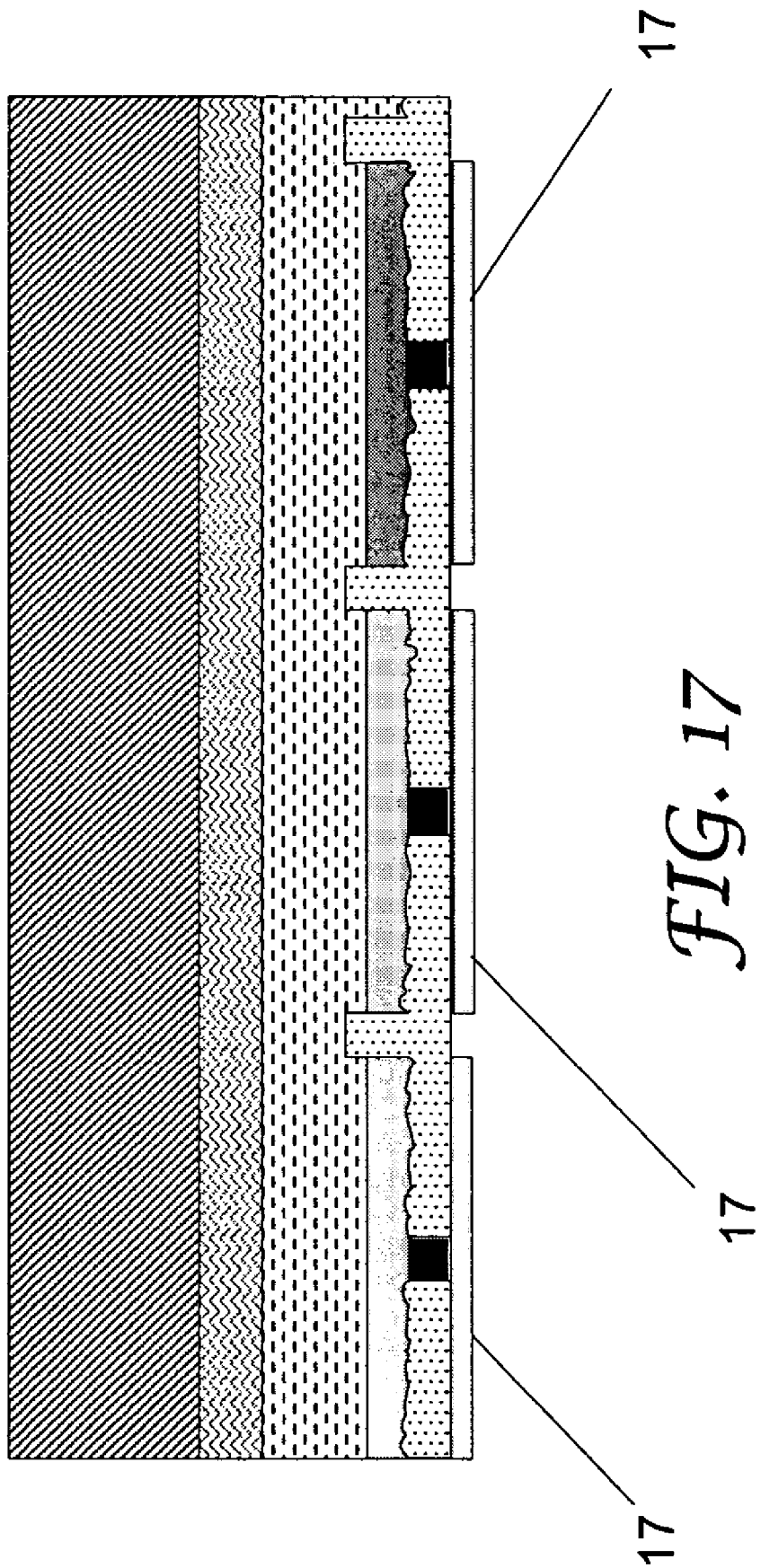
Figure 18:
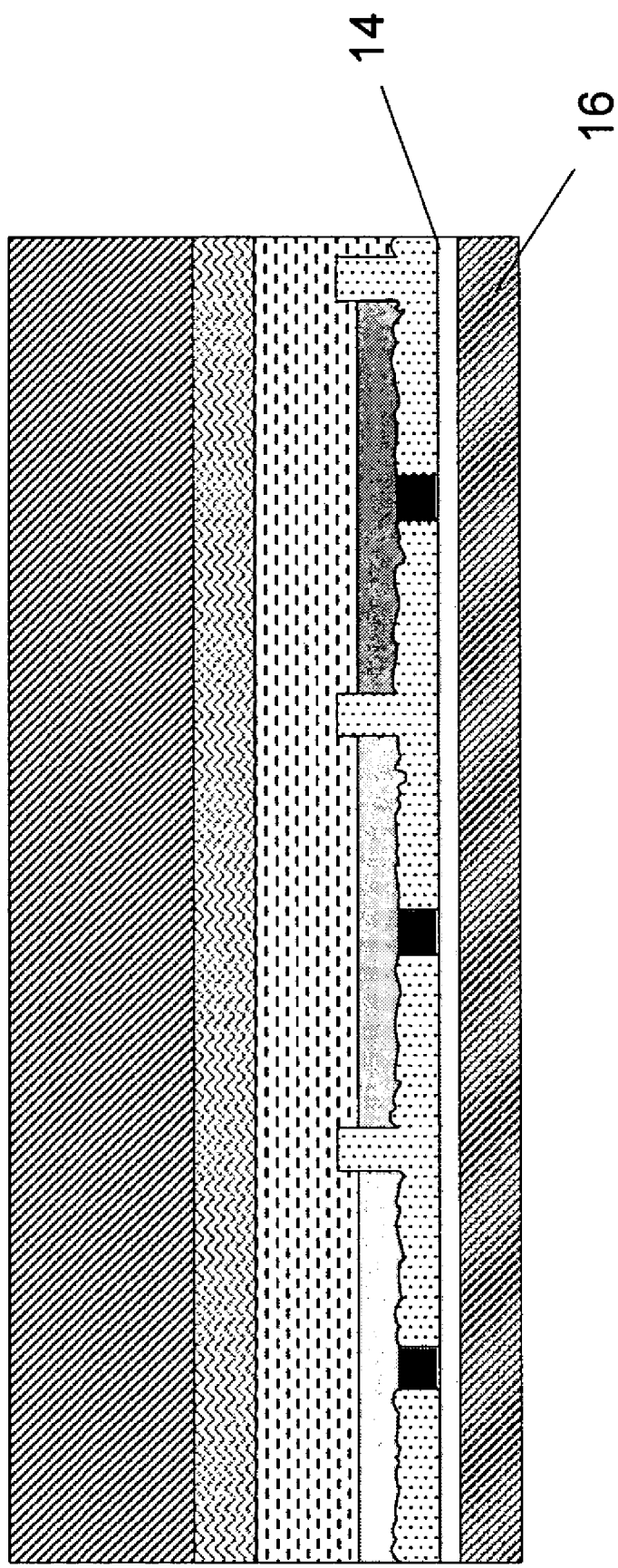
FIGS. 18 to 21 illustrate stages in a method of manufacturing a device substrate in accordance with still further alternative embodiment of the invention.
Figure 19:
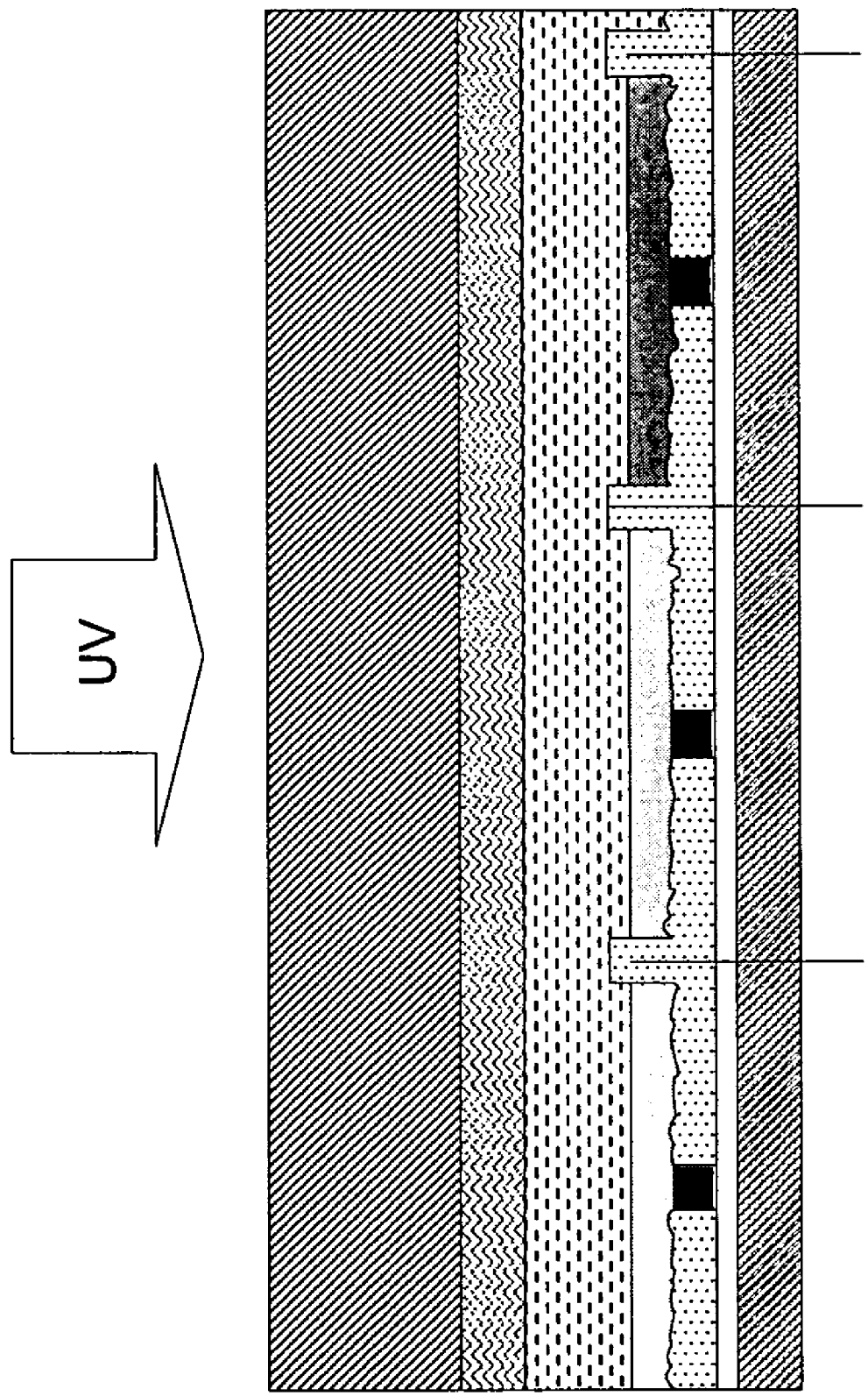
Figure 20:
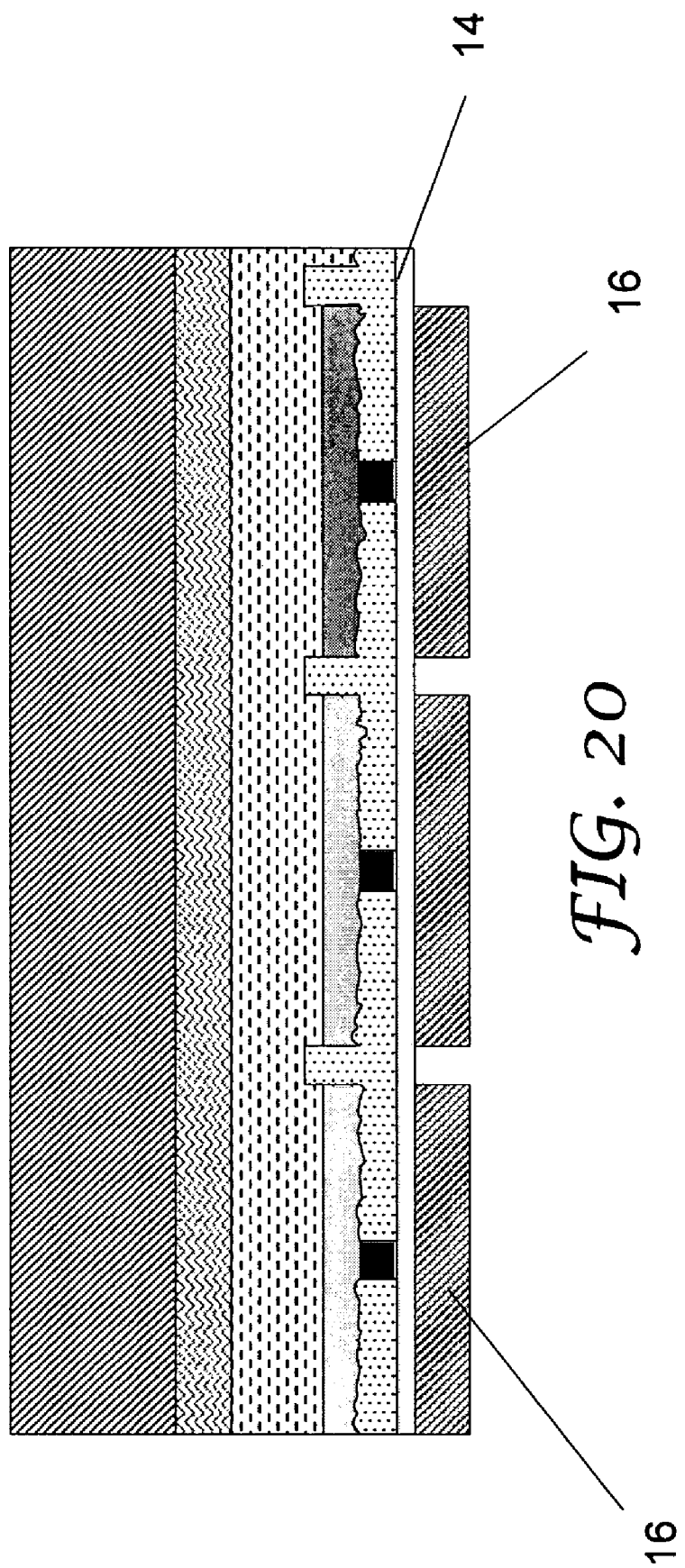
Figure 21:
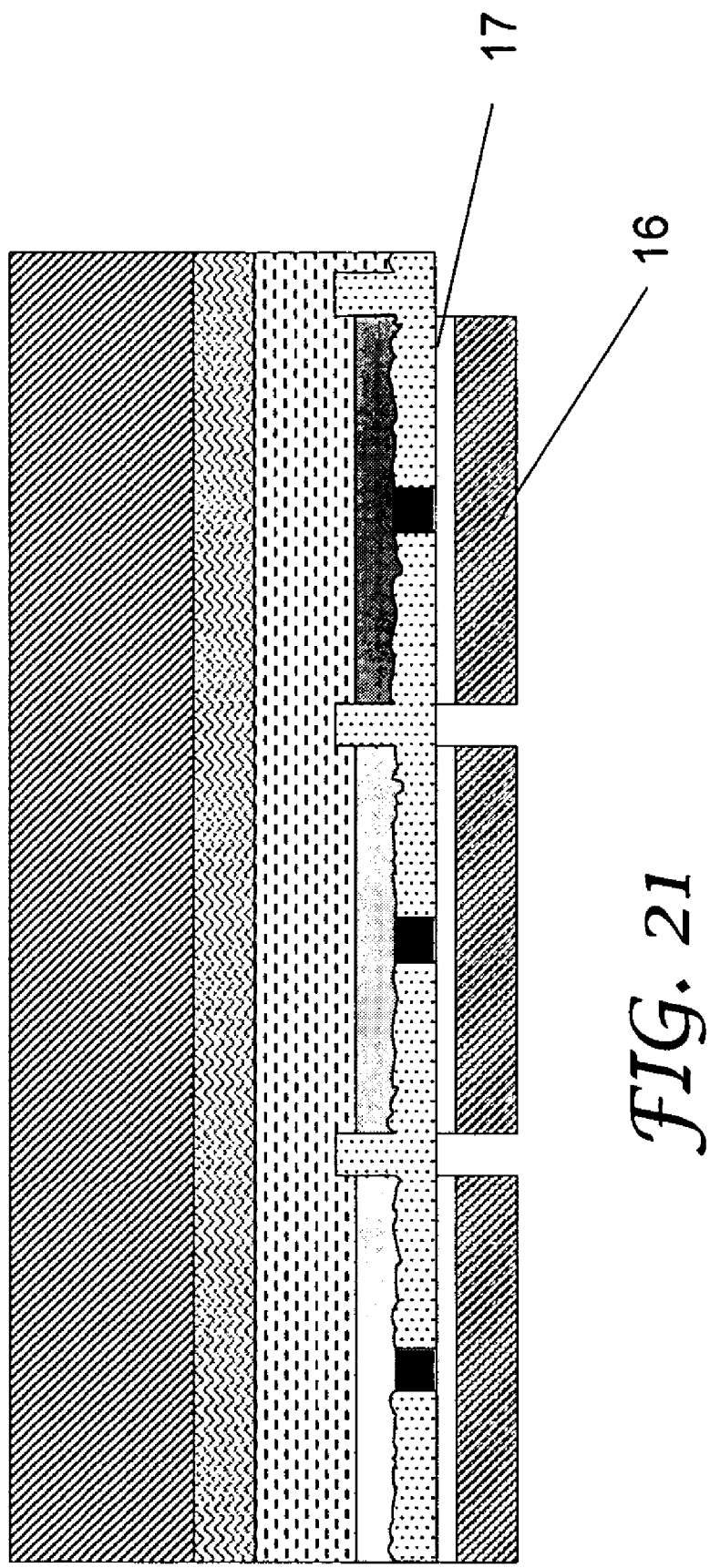

An alternative method of forming electrode tracks 17 from the transparent conductor layer 14 shown in FIG. 16 is illustrated in FIGS. 18 to 22. A positive photoresist material 16 (Shipley 1805) is coated on the transparent conductor 14 (FIG. 18). UV illumination through the substrate 13 transmits UV light through the levees 7 (FIG. 19) thereby curing the resist 16 in regions corresponding to the levees 7. The resist 16 is developed (Shipley Microposit Developer) to remove the exposed material (FIG. 20), and the transparent conductor 14 is then wet or dry etched (for example by sodium hypochlorite solution) to produce electrode tracks 17 (FIG. 21). Finally, the resist 16 is removed to leave the final substrate with electrode tracks as shown in FIG. 17. The resist 16 may be removed by means of standard solvents or a commercial resist stripper, for example acetone.

For a display substrate in which colour filters are not required, busbars may be aligned with transparent electrode structures formed thereon using the techniques described above, but using UV-absorbing filters 9, 10 and 11 that absorb little or no visible light.

Figure 22:
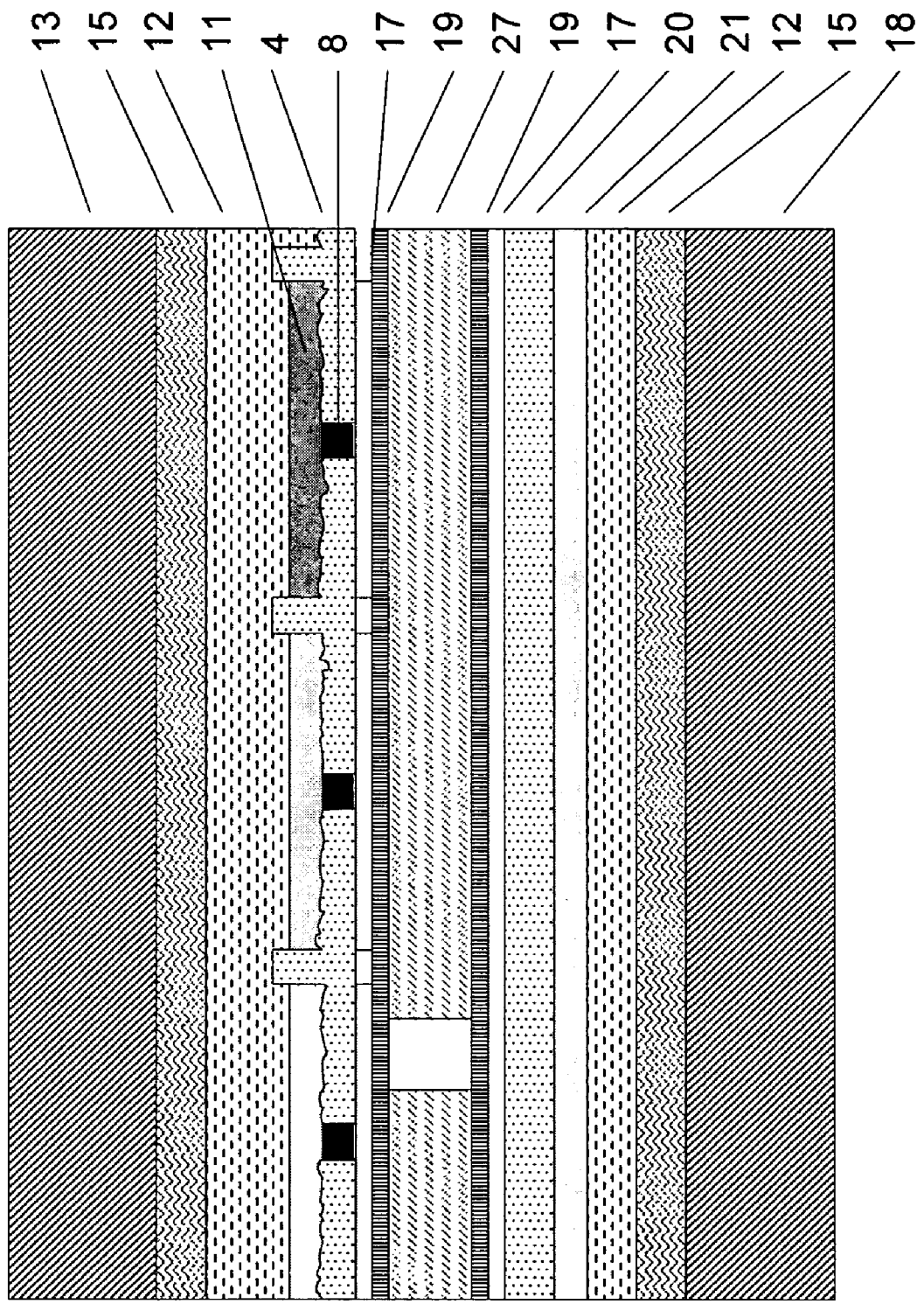
FIGS. 22 and 23 are schematic sectional and plan views respectively of a display device incorporating a display substrate manufactured in accordance with an embodiment of the invention.
Figure 23:
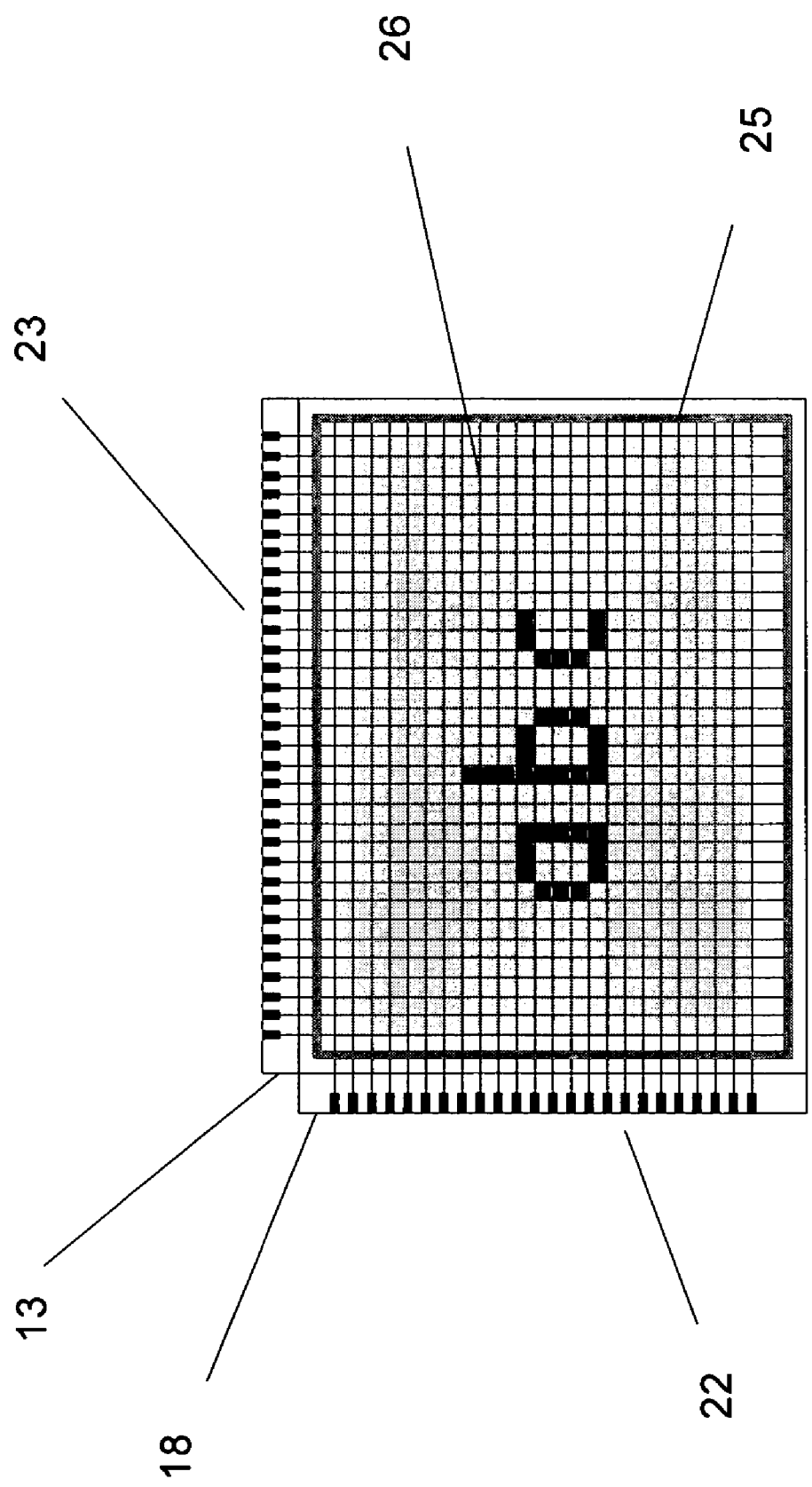

Turning now to FIGS. 22 and 23, an example of an electro-optic display device using a substrate manufactured in accordance with an aspect of the present invention is described. The device is a liquid crystal display (LCD) in this example, but the substrates may be employed in other types of display device. The device comprises a first display substrate 13 and a second display substrate 18, each of which is provided with an adhered polariser 15 in a manner known per se. The structure shown in FIG. 17 is provided with an alignment layer 19 for inducing a desired local uniform alignment in molecules of a liquid crystal material 27. The polariser 15 on the second substrate 18 is affixed to a UV-blocking layer 21 by a layer of adhesive 15. The UV-blocking layer 21 has been used to form electrode tracks 17 on busbars in the layer shown schematically as 20. The layer 20 contains busbars, dielectric structures, and UV-filters (not shown). The lower electrode structures 17 are also provided with an alignment layer 19. Any desired alignment layers 19 known to those skilled in the art may be used, for example rubbed polyimide. Depending on the type of display mode, the two alignment layers may induce the same type of alignment (for example planar, tilted planar, or homeotropic) or different types. Where both alignment layers 19 produce a planar or tilted planar alignment, the direction of alignment may be the same or different. For example, in a twisted nematic display, both alignment layers may induce planar alignment, with the orientation of the alignments being perpendicular.

The display is provided with a peripheral seal 25 to retain the liquid crystal material 27. In the example illustrated in FIG. 23, a plurality of busbars 22 form row-addressing electrodes and a plurality of busbars 23 form column-addressing electrodes. Pixels 26 are defined at locations where row and column electrodes overlap, and characters or other indicia may be displayed in regions where a sufficient voltage is applied across appropriate pixels, thereby modifying the optical behaviour of the liquid crystal in the region of the pixels so that there is a visible difference when the display is viewed between the polarisers 15.

Other features known per se may optionally be included in the display by conventional means. Examples include backlights and one or more antiglare layers.

Figure 24:
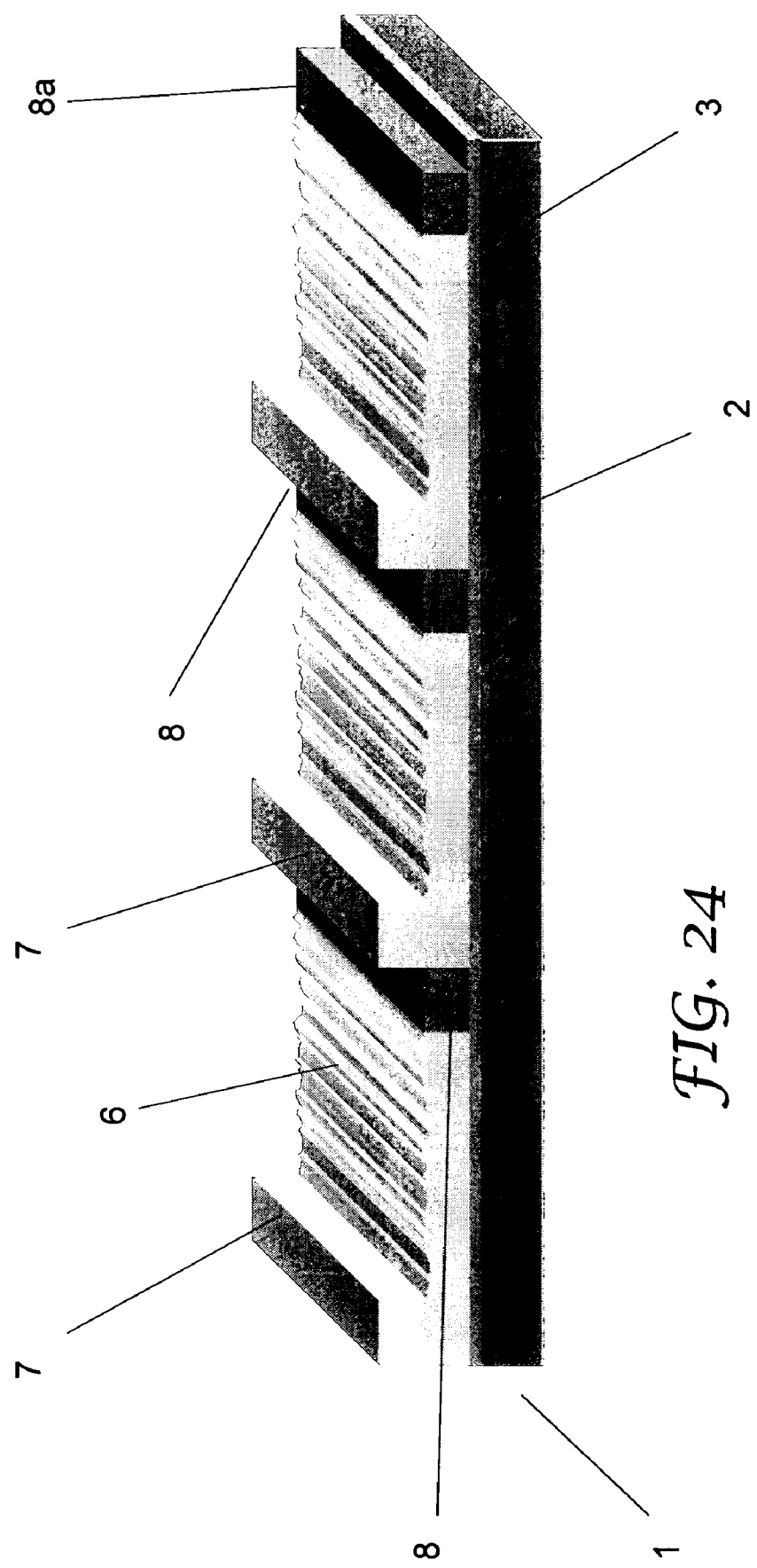
FIG. 24 is a perspective view corresponding to FIG. 3, illustrating another alternative embodiment of the present invention.

Each busbar 8 need not be in the middle of its associated electrode track 17, but may be located at any desired contact line on the track. In FIG. 24, part of a transfer carrier is shown, in which the busbars 8 are formed adjacent to the levees 7 on the planar conductive surface 3. Subsequent UV exposure of a transparent conductor through the levees 7 will result in the busbars being aligned at the sides of corresponding transparent electrode tracks.

Figure 25:
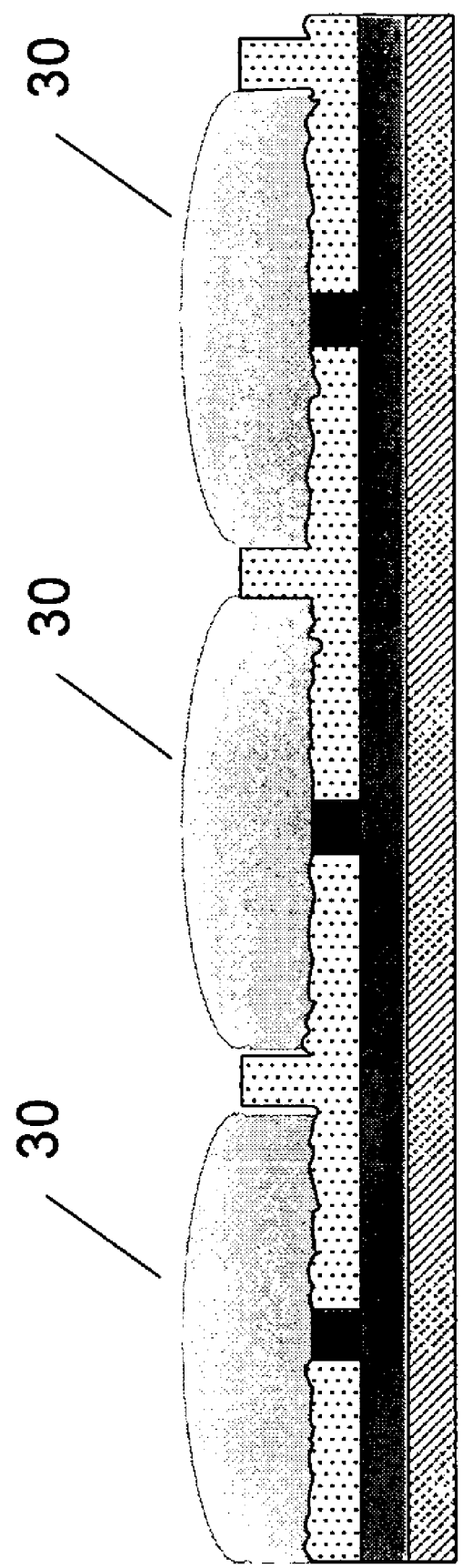
FIGS. 25 and 26 illustrate the formation of patterned transparent electrode structures in accordance with further alternative embodiments of the invention.
Figure 26:
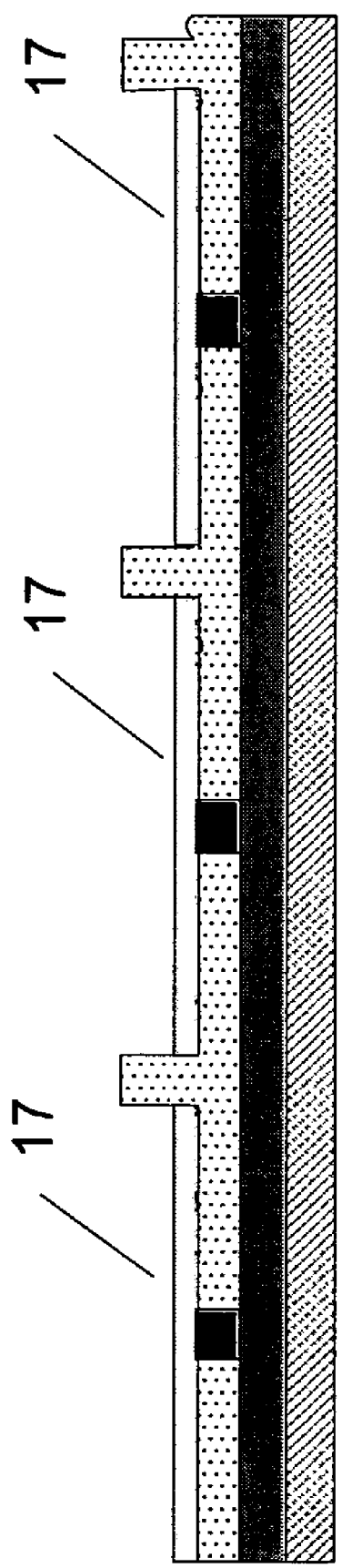

A further alternative method for forming the transparent conductors in alignment with the colour elements and busbar structures is shown in FIGS. 25 and 26. The carrier 1 is initially processed as shown in FIGS. 1 to 3. FIG. 25 shows the deposition of a dilute solution-based transparent conductor 30 (e.g. PEDOT:PSS Baytron P) by known means (e.g. gravure or slot coating). FIG. 26 shows the processed carrier after the removal of the solvent and any required thermal or radiative baking of the material to form discrete thin transparent conducting areas 17. The surface interaction between the transparent conducting material and the patterned dielectric layer is such that the transparent conductor does not form a continuous layer over the levee structure and consequently is patterned by that means. Subsequent steps for the deposition of the colour filter or other materials continue as described above and shown in FIGS. 4 to 7.

Figure 27:
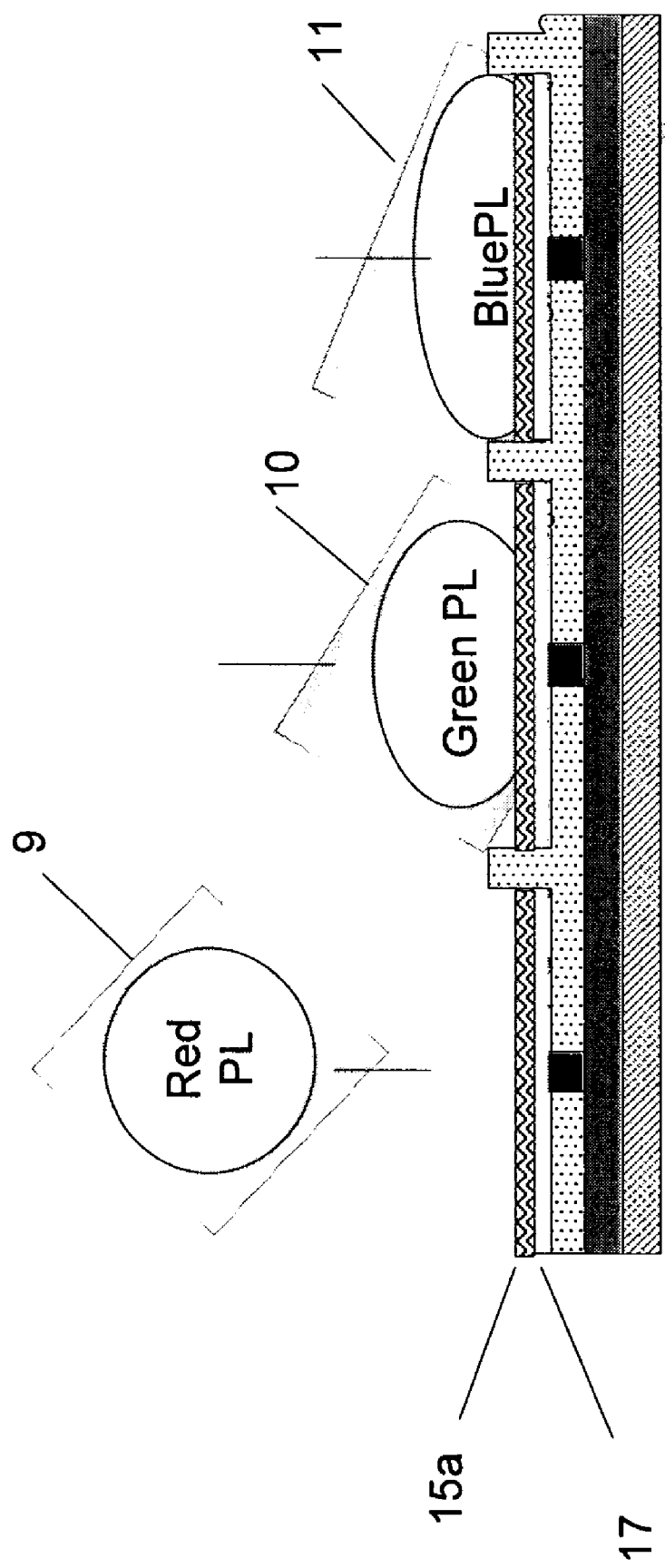
FIGS. 27 and 28 illustrate respectively the formation of an emissive colour matrix and a display employing the matrix in accordance with further embodiments of the invention.
Figure 28:
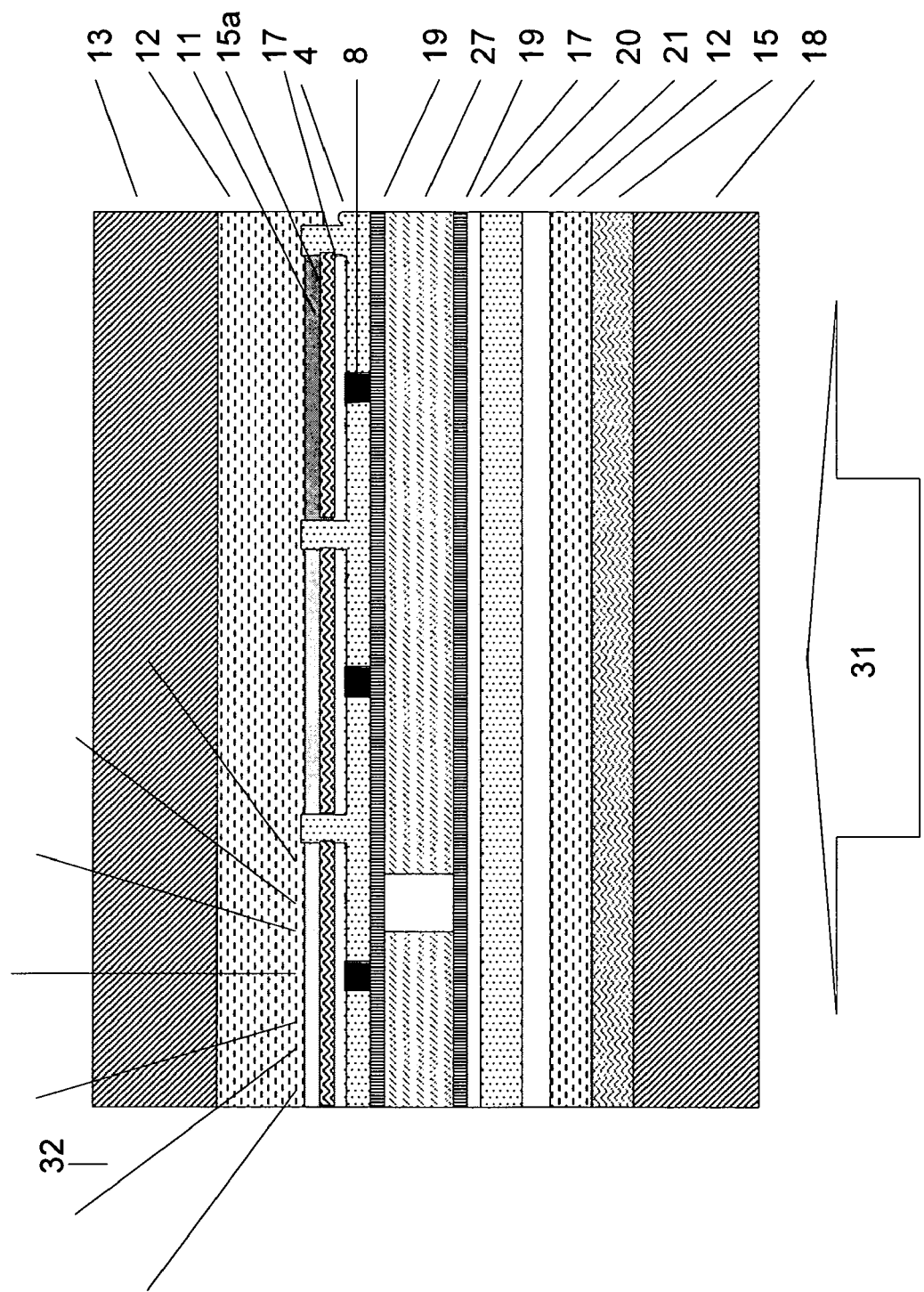

A further alternative means of forming an emissive colour matrix is shown in FIGS. 27 and 28, wherein a photoluminescent optical layer and a suitable wavelength backlight is used instead of a visible wavelength backlight and optical colour filters. The carrier 1 is initially processed as described above and shown in FIGS. 1 to 3. Preferably the transparent electrode is deposited and patterned as above and shown in FIGS. 25 and 26. If a polarisation state-modifying lightvalve LC effect is to be used a coatable polariser 15a is deposited into the channels and aligned by any suitable means, including alignment structures on the surface of the transparent resin defining the channels as shown in FIG. 27. FIG. 28 shows the deposition of photoluminescent materials for example by inkjet printing to form the patterned emitters of red, green and blue 9, 10 and 11 respectively into channels into which a transparent conductor 17 and polariser 15a have already been deposited. Prior or further materials may also be deposited to enhance the optical efficiency of the effect (e.g. colour filters upon the photoluminescent layer to reduce reflections of ambient light, or reflective materials underneath the photoluminescent layer to reduce back-scattered radiation). The carrier and final display substrate are laminated and transferred as described above resulting in the completed substrate 13.

FIG. 29 shows an electro-optic display device using a substrate manufactured in accordance with this aspect of the present invention. A second display substrate 14 is prepared and in this embodiment an LC lightvalve is effected by means of alignment layers 19, and liquid crystal layer 27 with suitable electro-optic cell spacing and construction by methods known per se. In this example a backlight 31 emitting ultraviolet light is polarised by means of a polariser 15. UV light which passes the second polariser 15a and falls on the photoluminescent layer 9, 10 or 11 causes the emission of narrowband visible light 32 (i.e. red, green or blue respectively) in a diffuse manner which is desirable for wide angle viewing and optically efficiency.

The articles "a" and "an" when used herein denote "at least one" where the context permits.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately, or in any suitable combination.

It is to be recognized that various alterations, modifications, and/or additions may be introduced into the constructions and arrangements of parts described above without departing from the scope of the present invention.

The disclosures in United Kingdom patent application number 0406310.3, from which this application claims priority, are incorporated herein by reference.

The disclosures in United Kingdom patent application number 0423134.6, from which this application claims priority, are incorporated herein by reference.

The invention claimed is:

1. A method of applying color elements and addressing busbars to a display substrate in a defined alignment relative to each other, the method comprising:

forming a series of translucent dielectric structures on a planar surface of a carrier, each structure comprising a color element receiving surface region and a raised levee, adjacent dielectric structures being spaced apart to define a trench therebetween;

forming the busbars by at least partially filling each of the trenches with an electrically conductive material;

depositing a color element material on each of the color element receiving surface regions to form a series of color elements;

affixing the color elements and levees to a translucent display substrate using a translucent adhesive material; and removing the carrier.

2. A method according to claim 1, wherein the color elements are light filters.

3. A method according to claim 2, wherein the light filters are at least partially ultraviolet (UV) absorbent.

4. A method according to claim 1, wherein the color element material is deposited via an inkjet print head.

5. A method according to claim 3, further comprising applying a layer of a translucent conductor material in contact with the busbars, and treating the conductor material using UV light transmitted through the display substrate and the levees to form the conductor material into translucent electrode tracks in alignment with and in contact with the busbars.

6. A method according to claim 1, further comprising providing a polariser between the levees and the display substrate.

7. A method according to claim 6, wherein the polariser is provided by applying a coatable polariser layer on the color elements and the levees.

8. A method according to claim 6, wherein the polariser is provided adhered on the display substrate and wherein affixing the color elements and the levees to the display substrate comprises affixing the color elements and the levees to the polariser.

9. A method according to claim 1, further comprising providing an optical film between the levees and the display substrate.

10. A method according to claim 9, wherein the optical film comprises a compensation retarder.

11. A method according to claim 1, further comprising providing a polariser between a color element and a color element receiving surface region.

12. A method according to claim 11, wherein the polariser is provided by applying a coatable polariser layer on the translucent dielectric structures prior to depositing the color element material.

13. A method according to claim 1, further comprising providing a transparent conducting layer on each color element receiving surface region prior to depositing the color element material.

14. A method according to claim 13, wherein the transparent conducting layer is uniformly coated and forms a patterned layer upon drying determined by the raised levees.

15. A method according to claim 1, wherein the surface of the carrier is conductive, and wherein the busbars are formed by electroplating.

16. A method of applying light filters and addressing busbars to a display substrate in a defined alignment relative to each other, the method comprising:

forming the light filters and the busbars on a conductive surface of a transfer carrier with the busbars being in electrical contact with the conductive surface;

adhering the light filters and the busbars to the display substrate;

and removing the transfer carrier.

17. A method of applying light filters and addressing busbars to a display substrate in a defined alignment relative to each other, the method comprising:

forming a series of translucent dielectric structures on a planar surface of a carrier, each structure comprising a filter receiving surface region and a raised levee, adjacent dielectric structures being spaced apart to define a trench therebetween;

forming the busbars by at least partially filling each of the trenches with an electrically conductive material;

depositing a light filter material on each of the filter receiving surface regions to form a series of light filters;

affixing the light filters and levees to a translucent display substrate using a translucent adhesive material; and removing the carrier.

18. A method of applying color filters and addressing busbars to a display substrate in a defined alignment relative to each other, the method comprising:

forming a series of translucent dielectric structures on a planar, conductive surface of a carrier, each structure comprising a wettable surface region and a raised levee, adjacent dielectric structures being spaced apart to define a trench therebetween;

forming the busbars by at least partially filling each of the trenches with a metal by electroplating;

depositing a colored material on each of the wettable surface regions by inkjet printing to form a series of color filters;

affixing the color filters and levees to a translucent display substrate using a translucent adhesive material; and removing the carrier.

19. A method of applying emissive color elements and addressing busbars to a display substrate in a defined alignment relative to each other, the method comprising:

forming the emissive color elements and the busbars on a surface of a transfer carrier:

adhering the emissive elements and the busbars to the display substrate; and removing the transfer carrier, wherein the color elements at least partially absorb ultraviolet (UV) light and are spaced apart from each other by regions that are substantially transmissive of UV light.

20. A method according to claim 19, wherein the color elements are photoluminescent.

21. A method according to claim 19, further comprising:

forming a transparent conductor layer on the busbars after removal of the transfer carrier, the transparent conductor layer being capable of being rendered substantially non-conductive after exposure to UV light of sufficient intensity and duration;

illuminating the conductor layer with light of sufficient intensity and duration through the display substrate to cause substantial loss of conductivity in regions of the conductor layer corresponding to spaces between the color elements;

thereby forming a plurality of transparent electrode tracks, each of which is in electrical contact with a busbar.

22. A method according to claim 19, further comprising:

forming a transparent conductor layer on the busbars after removal of the transfer carrier;

applying a layer of positive photoresist material to the conductor layer;

illuminating the photoresist material with UV light of sufficient intensity and duration through the display substrate to effect a chemical change in exposed regions of the photoresist material corresponding to spaces between the color elements;

developing the photoresist to remove the photoresist in the exposed regions;

etching the conductor layer in regions where the photoresist has been removed, thereby forming a plurality of transparent electrode tracks, each of which is in electrical contact with a busbar; and removing remaining photoresist.

23. A method of applying color elements and addressing busbars to a display substrate in a defined alignment relative to each other, the method comprising:

forming the color elements and the busbars on a surface of a transfer carrier;

adhering the color elements and the busbars to the display substrate; and removing the transfer carrier;

wherein the color elements at least partially absorb ultraviolet (UV) light and are spaced apart from each other by regions that are substantially transmissive of UV light.

24. A method according to claim 23, further comprising:

forming a transparent conductor layer on the busbars after removal of the transfer carrier, the transparent conductor layer being capable of being rendered substantially non-conductive after exposure to UV light of sufficient intensity and duration;

illuminating the conductor layer with UV light of sufficient intensity and duration through the display substrate to cause substantial loss of conductivity in regions of the conductor layer corresponding to spaces between the color elements;

thereby forming a plurality of transparent electrode tracks, each of which is in electrical contact with a busbar.

25. A method according to claim 23, further comprising:

forming a transparent conductor layer on the busbars after removal of the transfer carrier;

applying a layer of positive photoresist material to the conductor layer;

illuminating the photoresist material with UV light of sufficient intensity and duration through the display substrate to effect a chemical change in exposed regions of the photoresist material corresponding to spaces between the color elements;

developing the photoresist to remove the photoresist in the exposed regions;

etching the conductor layer in regions where the photoresist has been removed, thereby forming a plurality of transparent electrode tracks, each of which is in electrical contact with a busbar; and removing remaining photoresist.

26. A method of applying color elements and addressing busbars to a display substrate in a defined alignment relative to each other, the method comprising:

forming the color elements and the busbars on a conductive surface of a transfer carrier with the busbars in electrical contact with the conductive surface;

adhering the color elements and the busbars to the display substrate; and removing the transfer carrier.

27. A method according to claim 26, wherein the busbars are formed on the conductive surface by electroplating.

28. A transfer carrier comprising a substrate having a conductive surface on which is releasably mounted a plurality of color elements and a plurality of busbars in a defined alignment relative to each other, the busbars being in electrical contact with the conductive surface.

29. A transfer carrier according to claim 28, wherein the surface is planar.

30. A transfer carrier according to claim 28, wherein each of the plurality of color elements is provided on a substantially transparent dielectric structure on the surface of the substrate.

31. A transfer carrier according to any of claims 28, wherein the color elements are light-filters.

* * * * *

UNITED STATES PATENT AND TRADEMARK OFFICE
CERTIFICATE OF CORRECTION

| | | |
|---|---|---|
| PATENT NO. | : 7,897,303 B2 | Page 1 of 1 |
| APPLICATION NO. | : 10/587200 | |
| DATED | : March 1, 2011 | |
| INVENTOR(S) | : John Christopher Rudin et al. | |

It is certified that error appears in the above-identified patent and that said Letters Patent is hereby corrected as shown below:

In column 10, line 36, in Claim 19, delete "carrier:" and insert -- carrier; --, therefor.

In column 10, line 37, in Claim 19, delete "emissive" and insert -- emissive colour --, therefor.

In column 12, line 35, in Claim 31, delete "any of claims" and insert -- claim --, therefor.

Signed and Sealed this
Fifth Day of July, 2011

David J. Kappos
*Director of the United States Patent and Trademark Office*